(12) United States Patent
Kudo et al.

(10) Patent No.: US 7,367,573 B2
(45) Date of Patent: May 6, 2008

(54) ALL TERRAIN VEHICLE

(75) Inventors: Kazuhiro Kudo, Saitama (JP); Tetsuya Nakazawa, Saitama (JP); Takahiro Kokubu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 11/086,761

(22) Filed: Mar. 23, 2005

(65) Prior Publication Data

US 2005/0217912 A1    Oct. 6, 2005

(30) Foreign Application Priority Data

| Mar. 31, 2004 | (JP) | ............... P. 2004-107907 |
| Mar. 31, 2004 | (JP) | ............... P. 2004-107973 |
| Mar. 31, 2004 | (JP) | ............... P. 2004-108296 |
| Mar. 31, 2004 | (JP) | ............... P. 2004-108564 |

(51) Int. Cl.
   *B62D 21/10*    (2006.01)

(52) U.S. Cl. ............... 280/124.109; 280/850; 296/199

(58) Field of Classification Search ............... 180/68.6, 180/311; 280/28, 850, 124.109, 124.164, 280/124.165; 293/117; 296/193.07, 199
See application file for complete search history.

(56) References Cited

U.S. PATENT DOCUMENTS

| 4,600,074 | A | * | 7/1986 | Watanabe et al. | ............ 180/251 |
| 4,685,530 | A | * | 8/1987 | Hara | ............ 180/219 |
| 5,577,570 | A | * | 11/1996 | Shiohara et al. | ............ 180/219 |
| 6,360,839 | B1 | * | 3/2002 | Urano et al. | ............ 180/229 |
| 6,460,907 | B2 | * | 10/2002 | Usui | ............ 293/115 |
| 6,547,027 | B1 | * | 4/2003 | Kalhok et al. | ............ 180/312 |
| 6,571,904 | B2 | * | 6/2003 | Izumi | ............ 180/366 |
| 6,588,529 | B2 | * | 7/2003 | Ishii et al. | ............ 180/219 |
| 6,695,089 | B2 | * | 2/2004 | Adachi et al. | ............ 180/311 |
| 6,702,307 | B2 | * | 3/2004 | Becker et al. | ............ 280/124.141 |
| 6,938,676 | B2 | * | 9/2005 | Lan et al. | ............ 165/41 |
| 7,231,996 | B2 | * | 6/2007 | Karube et al. | ............ 180/69.24 |
| 2002/0041076 | A1 | * | 4/2002 | Becker et al. | ............ 280/124.179 |
| 2002/0117843 | A1 | | 8/2002 | Rasidescu et al. | |
| 2004/0188156 | A1 | * | 9/2004 | Karube et al. | ............ 180/68.4 |
| 2005/0217912 | A1 | * | 10/2005 | Kudo et al. | ............ 180/89.1 |

(Continued)

FOREIGN PATENT DOCUMENTS

CN    2463013 Y    12/2001

(Continued)

OTHER PUBLICATIONS

Chinese Office Action dated May 18, 2007, Application No. 200510056095.X.

*Primary Examiner*—Eric Culbreth
*Assistant Examiner*—Karen J. Amores
(74) *Attorney, Agent, or Firm*—Westerman, Hattori, Daniels & Adrian, LLP.

(57) ABSTRACT

A front frame portion of an underframe which constitutes a lower portion of a vehicle body frame is formed in a triangular shape, and, at the same time, the front frame portion of the underframe is formed in a peaked shape in a plan view. The underframe is integrally formed by casting. An upper arm and a lower arm which support left and right front wheels are respectively mounted on the left and right sides of the front frame portion.

4 Claims, 16 Drawing Sheets

U.S. PATENT DOCUMENTS

| | | | |
|---|---|---|---|
| 2006/0061052 A1* | 3/2006 | Lemieux | 280/28 |
| 2006/0076742 A1* | 4/2006 | Scholl | 280/28 |
| 2006/0254842 A1* | 11/2006 | Dagenais et al. | 180/215 |
| 2007/0007758 A1* | 1/2007 | Maeda et al. | 280/788 |
| 2007/0142162 A1* | 6/2007 | Seki et al. | 476/40 |
| 2007/0178977 A1* | 8/2007 | Seki | 464/139 |

FOREIGN PATENT DOCUMENTS

| | | |
|---|---|---|
| JP | 62-66894 | 4/1987 |
| JP | 63-48690 | 4/1988 |
| JP | 2671346 | 7/1997 |

* cited by examiner

ALL TERRAIN VEHICLE

The present application claims foreign priority based on Japanese Patent Application Numbers. P.2004-107907 (filed on Mar. 31, 2004), P.2004-107973 (filed on Mar. 31, 2004), P.2004-108296 (filed on Mar. 31, 2004) and P.2004-108564 (filed on Mar. 31, 2004), the contents of which are incorporated herein by reference.

BACKGROUND OF THE INVENTION

The present invention relates to an all terrain vehicle for traveling on a leveled land and an unleveled land, and more particularly to a vehicle body frame structure, a skid plate, a sub frame, and a suspension structure of the vehicle.

As a related vehicle body frame structure of a vehicle, there has been known a vehicle frame structure which is assembled by joining a plurality of pipe frames (see JP-B2-2671346, for example).

FIG. 3 of JP-B2-2671346 is explained hereinafter. Here, numerals described in JP-B2-2671346 are used as numerals here.

A vehicle body frame 11 includes a main pipe 18 which is formed on a center upper portion of a vehicle, a pair of left and right front tubes 19, 19 which extend frontwardly, obliquely and downwardly from a front portion of the main pipe 18, a pair of left and right body tubes 20, 20 which extend downwardly from a rear portion of the main pipe 18, a pair of left and right lower tubes 21, 21 which integrally extend frontwardly from lower portions of the body tubes 20, 20 and are connected with the above-mentioned front tubes 19, 19, a pair of left and right down tubes 26, 26 which are extended between the front tubes 19, 19 and between the lower tubes 21, 21 respectively, and reinforcements 27, 27 which are provided at positions where the front tubes 19, 19 and the down tubes 26, 26 cross each other. Here, numerals 28, 28 are mounting brackets on which upper ends of left and right front cushion units 29, 29 (see FIG. 1 of the publication) are mounted.

The above-mentioned front tubes 19 and lower tubes 21 constitute portions which support a front wheel, while the mounting brackets 28 constitute portions which support upper end of the front cushion units 29. Since a large load acts on these front tubes 19, the lower tubes 21 and the mounting brackets 28, it is desirable that these members have the high rigidity. Further, with respect to a saddle-ride type vehicle which travels on an unleveled land, since the vehicle body frame 11 has a large number of portions which are exposed to the outside, when the appearance of the vehicle body frame 11 is enhanced, the product value of the saddle-ride type vehicle is enhanced. Further, it is also desirable to reduce a cost with respect to the vehicle body frame.

Further, as a related skid plate of a vehicle, there has been known a skid plate mounted on a front end portion of a vehicle body frame along a vehicle body frame (for example, see JP-U-62-066894).

A technique disclosed in JP-U-62-066894 is explained hereinafter. Here, numerals described in JP-U-62-066894 are used as numerals here.

In FIG. 2 of the JP-U-62-066894, the following structure is described. On a front end portion of a vehicle body frame 1 of a vehicle, to be more specific, on curved portions 26, 26 of a pair of left and right guard members 23, 23, a skid plate 25 is formed along the curved portions 26, 26.

The skid plate 25 is a member which prevents a bottom portion of vehicle body from being brought into contact with and damaged by a ground when a wheel falls from the vehicle or the vehicle travels on an uneven ground.

With respect to the above-mentioned skid plate 25 is provided for protecting the front portion of the vehicle body, there has been a demand for a shape of the skid plate 25 which can more effectively protect parts in the vehicle body.

Further, as a related sub frame, there has been known a rear carrier mounted on a rear portion of a vehicle body frame (for example, see JP-A-11-198882).

A technique disclosed in JP-A-11-198882 is explained hereinafter. Here, numerals described in JP-A-11-198882 are used as numerals here.

In FIG. 3 of JP-A-11-198882, a vehicle body frame 2 having the following structure is described. A lower pipe 4 is connected with a lower portion of an upper pipe 3, a seat rail 17 is extended rearwardly from an upper portion of a rear portion of the upper pipe 3, and seat stay 18 is extended between the seat rail 17 and the lower pipe 4. Further, FIG. 3 of JP-A-11-198882 describes that a rear carrier 65 is mounted on the seat rail 17.

Further, FIG. 2 of JP-A-11-198882 describes a saddle-ride seat 25 which is mounted on the seat rail 17 (see the above-mentioned FIG. 3 of JP-A-11-198882), a rear cover 61 which covers a rear portion of a vehicle body, left and right rear fenders 62, 62 which are integrally formed with the rear cover 61, and tail lamps 63 which are respectively mounted on these rear fenders 62, 62.

The above-mentioned vehicle body frame 2 includes mounting portions for mounting the rear cover 61 and the rear fenders 62, 62. The seat rail 17 includes a mounting portion for mounting a saddle-ride seat 25. The rear fenders 62, 62 include mounting portions for mounting a tail lamp 63. By providing these mounting portions to one member, for example, it is possible to reduce the number of parts and the number of assembling man-hours whereby the reduction of cost can be achieved.

Further, since the above-mentioned rear carrier 65 is firmly supported on the vehicle body frame 2, for example, the rear carrier 65 is convenient as a support portion of parts. It is desirable that the rear carrier is not limited to a carrier and is expanded to other applications.

Further, as a related suspension structure, there has been known the suspension structure which connects a cushion unit to suspension arms through push-pull rods. (See JP-U-63-048690, for example.)

A technique disclosed in JP-U-63-048690 is explained hereinafter. Here, numerals described in JP-U-63-048690 are used as numerals here.

As shown in FIG. 2 of JP-U-63-048690 and FIG. 3 of JP-U-63-048690, a suspension having the following structure is shown. That is, upper arms 13 and lower arms 14 are vertically movably mounted on side portions of a front portion of a vehicle body frame 1, a push-pull rod 12 which extends in the substantially vehicle-width direction is extended between a cross member 15 which is mounted on the upper arm 13 and a link arm 9 of a cushion arm 7 which is swingably mounted on the vehicle body frame 1, and a cushion unit 10 is extended between a link arm 8 which is mounted on the cushion arm 7 and the vehicle body frame 1.

The up-and-down movement of the upper frame 13 is converted into the movement in the vehicle-width direction of the push-pull rod 12, and the movement in the vehicle-width direction of the push-pull rod 12 is converted into the movement in the front-to-rear direction of the cushion unit 10 by means of the cushion arm 7.

For example, in the suspension structure in which the cushion unit is directly connected to the suspension arm such as the upper arm or the lower arm and the cushion unit is extended in the substantially vertical direction, since the direction of the up-and-down movement of the suspension arm and the direction of a stroke of the cushion unit are substantially same, the up-and-down movement of the suspension arm can be effectively transmitted to the cushion unit.

However, in the structure of JP-U-63-048690, in converting the up-and-down movement of the upper arm 13 into the movement in the vehicle-width direction of the push-pull rod 12, since the direction of the up-and-down movement of the upper arm 13 and the direction of the movement in the vehicle-width direction of the push-pull rod 12 are arranged substantially orthogonal to each other, even when the upper arm 13 is largely moved in the up-and-down direction, a moving quantity of the push-pull rod 12 in the vehicle-width direction is small. Hence, the up-and-down movement of the upper arm 13 cannot be effectively transmitted to the push-pull rod 12, in the structure of JP-U-63-048690.

With respect to the above-mentioned suspension structure of the vehicle in which cushion unit is directly connected to the suspension arm, since the cushion unit is extended substantially upwardly from the suspension arm, a height of the vehicle is increased thus leading to the large-sizing of the vehicle body. Although it is possible to suppress the increased of the height of the vehicle by making a total length of the cushion unit short, it becomes impossible to ensure the stroke of the cushion unit. Further, when the vehicle body becomes large-sized, this adversely influences the traveling performance of the vehicle.

SUMMARY OF THE INVENTION

Accordingly, it is an object of the present invention, in the vehicle body frame structure of a vehicle, to enhance the rigidity of a vehicle body frame, to enhance the appearance and to realize the reduction of cost.

Further, it is another object of the present invention to effectively protect parts in a vehicle body by taking a shape of a skid plate of a vehicle into consideration.

Further, it is another object of the present invention to use a sub frame for multiple purposes as a support portion of parts so as to reduce a cost.

Further, it is another object of the present invention, in the suspension structure of a vehicle, to more effectively transmit the vertical movement of a suspension arm to a cushion unit and, to achieve the miniaturization and the compacting of the vehicle and, also to enhance the traveling performance of a vehicle.

In order to achieve the objects, in a first aspect of the invention, a front portion of an underframe which constitutes a lower portion of a vehicle body frame is formed in a triangular shape and, at the same time, a front portion of the underframe is formed in a peaked shape in a plan view, and the underframe is integrally formed by casting.

By forming the front portion of the underframe in a triangular shape, it is possible to increase the rigidity of the front portion of the underframe. Further, by integrally forming the underframe by casting, for example, compared to an underframe which is formed by assembling pipe frames by welding, the present invention can enhance the appearance of portions which are exposed to the outside. Further, compared to the welded underframe, it is possible to reduce the cost.

Moreover, in a second aspect of the invention, the underframe mounts suspension arms which support left and right front wheels on left and right sides of the triangular front portion thereof respectively, and cushion units which absorb an impact transmitted to the vehicle body frame through the suspension arms are arranged to be extended in the substantially front-to-rear direction along the vehicle body frame.

Since the suspension arms are supported on the front portion of the underframe having the high rigidity, it is possible to increase the supporting rigidity of the suspension arms. Further, since the cushion units are arranged along the vehicle body frame, it Is possible to concentrate the mass of the cushion units on the vehicle center side. Further, a projecting quantity of the cushion units in the sideward direction of the vehicle body can be decreased.

Moreover, in a third aspect of the invention, the cushion units have one ends thereof mounted on the vehicle body frame side and the other ends thereof connected to link members which are swingably mounted on the vehicle body frame through pivot portions, and the link members are connected with the suspension arms through rods.

By connecting the other end sides of the cushion units to the link members and by connecting the link members to the suspension arms through the rods, the degree of freedom of the arrangement of the cushion units can be increased due to the rods and hence, for example, it is possible to arrange the cushion units along the vehicle body frame.

Moreover, in a fourth aspect of the invention, a skid plate which covers the underframe is provided in front of the underframe, and the skid plate is formed into an M shape in a front view so as to allow the skid plate to cover the pivot portions and the suspension arm mounting portions.

By covering the pivot portions and the suspension arm mounting portions with the skid plate, it is possible to surely protect these pivot portions and the suspension arm mounting portions.

Moreover, in a fifth aspect of the invention, the underframe arranges a radiator in the inside thereof, the radiator is constituted of three divided radiators, the left and right radiators which are formed on left and right sides are arranged above the respective left and right frame members of the underframe, and the center radiator which is provided between the left and right radiators is arranged between the left and right frame members.

Since the left radiator and the right radiator are arranged above the left and right frame members respectively and the center radiator is arranged between the left and right frame members, it is possible to arrange the left radiator and the right radiator by making use of a maximum width of the underframe and, at the same time, it is possible to extend the center radiator downwardly and hence, it is possible to further increase a projection area of the whole radiator in the frontward direction of the vehicle body.

Further, in a sixth aspect of the invention, the skid plate having an upper peripheral portion thereof formed in an approximately M shape in a front view is mounted on a front portion of a vehicle body frame for protecting a front portion of the vehicle.

By forming the upper peripheral portion of the skid plate into an approximately M shape in a front view, end portions of the letter M, that is, left and right ends of an upper portion and left and right ends of a lower portion project and hence, it is possible to cover parts which are provided to the vehicle body, for example, constitutional parts of front suspensions with these portions.

Moreover, in a seventh aspect of the invention, the front cushion units extend in the approximately front-to-rear direction and have front ends thereof covered with crest portions of an M shape of the skid plate.

By covering the front ends of the front cushion units using the letter-M-shaped crest portions of the skid plate, it is possible to protect the front ends of the front cushion units with the skid plate.

Moreover, in an eighth aspect of the invention, the skid plate is mounted on a front portion of a tapered front frame formed by casting.

By mounting the skid plate on the front portion of the tapered front frame which is formed by casting, it is possible to firmly support the skid plate using the front frame, Moreover, in a ninth aspect of the invention, a pair of upper and lower suspension arms are formed on left and right sides of the vehicle body, rods are connected with lower sides of the suspension arms, distal ends of the rods are connected with the front cushion units by way of link members, and front portions of the link members are covered with the skid plate.

By covering the front portions of the link members with the skid plate, it is possible to surely protect the link members on which a large load acts from the lower arms side by way of the rods.

Further, an embodiment of the invention according to a tenth aspect of the invention provides a sub frame of a vehicle in which the sub frame is provided to a rear portion of a vehicle body frame, wherein the sub frame includes a tender mounting portion on which rear fenders for covering left and right rear wheels from above are mounted, a seat support portion which supports a seat on which an occupant sits, and a grab portion which a person can grab.

By providing the fender mounting portion, the seat support portion and the grab portion to the sub frame, compared to a case in which the fender mounting portion, the seat support portion and the grab portion are respectively separately provided, the present invention can reduce the number of parts and the number of assembling man-hours.

Moreover, in the eleventh aspect of the invention, the rear fenders are constituted of separate left and right fenders.

For example, compared to a case in which the rear fender is laterally integrally formed, the present invention can miniaturize the left and right rear fenders.

Moreover, in the twelfth aspect of the invention, the sub frame includes a tail lamp support portion which supports a tail lamp.

By providing the tail lamp support portion to the sub frame, compared to a case in which the tail lamp support portion is particularly provided, the number of parts can be reduced.

Moreover, in a thirteenth aspect of the invention, a muffler which is connected with an exhaust pipe side extended from an engine is arranged between the sub frame and the seat and, at the same time, the muffler is projected from the sub frame and a rear end portion of the seat.

By arranging the muffler between the sub frame and the seat and, at the same time, by allowing the muffler to project between the sub frame and the rear end portion of the seat, it is possible to reduce portions which are exposed to the outside of the muffler.

Moreover, in a fourteenth aspect of the invention, the sub frame is integrally formed by casting.

By integrally forming the sub frame by casting, it is possible to easily form the sub frame.

Further, the embodiment of the invention according to a fifteenth aspect provides a suspension structure of a vehicle in which suspension arms are respectively mounted on left and right sides of a front portion of a vehicle body frame, a front cushion unit which absorbs an impact which is transmitted to a vehicle body frame along the vehicle body frame is arranged to extend in the substantially front-to-rear direction of a vehicle, one end of the front cushion unit is connected with a vehicle body frame, a link member is swingably mounted on the vehicle body frame by way of a pivot portion, and the other end of the front cushion unit is connected to the link member, wherein the link member is rotatably provided in a plane along the front-to-rear direction of the vehicle body and, at the same time, is connected with the suspension arm by way of a rod which extends in the substantially vertical direction.

By connecting the other end of the front cushion unit to the suspension arm by way of the link member which is rotatably provided in the plane along the front-to-rear direction of the vehicle body and the rod which extends in the substantially vertical direction, it is possible to smoothly convert the up-and-down movement of the suspension arm into the up-and-down movement of the rod which extends substantially vertically and, then, it is possible to effectively convert the up-and-down movement of the rod into a stroke of the front cushion unit in the front-to-rear direction of the vehicle.

Moreover, in a sixteenth aspect of the invention, suspension arms are respectively mounted on left and right sides of a rear portion of the vehicle body frame, and left and right rear cushion units which absorb an impact which is transmitted to the vehicle body frame by way of the suspension arms are arranged substantially parallel along the vehicle body frame.

By arranging the left and right rear cushion units substantially parallel to the vehicle body frame, it is possible to make the rear portion of the vehicle body slim.

Moreover, in a seventeenth aspect of the invention, the rear cushion unit includes a hole portion which is opened in the direction orthogonal to an axis in an end portion thereof, and a reservoir tank is mounted in the hole portion by fitting.

By fitting and mounting the reservoir tank into the hole portion formed in the rear cushion unit in the direction orthogonal to the axis, it is possible to provide a novel appearance to the rear cushion unit.

Moreover, in a eighteenth aspect of the invention, the suspension arms constitute a double wishbone type suspension which is provided with a pair of upper and lower arms at one sides thereof, and the rod is connected with the arm at the lower side.

By connecting the rod with the lower-side arm, it is possible to arrange the suspension structure at a low position and hence, it is possible to set the center of gravity at a low level.

According to the first aspect, since the front portion of the underframe is formed in a triangular shape, it is possible to enhance the rigidity of the front portion of the underframe whereby it is possible to firmly support the suspension arms and the cushion units on the front portion of the underframe. Further, the underframe is integrally formed by casting and hence, the appearance of the portions which are exposed to the outside can be enhanced whereby the merchantability of all terrain vehicle can be enhanced. Further, by integrally forming the underframe by casting, it is possible to achieve the cost reduction of the vehicle body frame.

According to the second aspect, the suspension arms are supported on the front portion of the underframe having the high rigidity and hence, it is possible to enhance the supporting rigidity of the suspension arms. Further, since the cushion units are arranged along the vehicle body frame and hence, it is possible to concentrate a mass of the cushion units at the vehicle center side whereby the traveling performance such as the turning property of the all terrain vehicle can be enhanced.

According to the third aspect, the other-end sides of the cushion units are connected to the link members and the link members are connected with the suspension arms by way of the rods and hence, it is possible to increase the degree of freedom of the arrangement of the cushion units by the rods whereby, for example, the cushion units can be arranged along the vehicle body frame thus constituting the vehicle in a slim, miniaturized and compact manner and enhancing the getting-on-and-off property and the appearance.

According to the fourth aspect, since the pivot portions and the suspension arm mounting portions are covered with the skidplate, it is possible to surely protect these pivot portions and the suspension arm mounting portions whereby there liability of the all terrain vehicle can be enhanced.

According to the fifth aspect, since the left radiator and the right radiator are arranged above the left and right frame members respectively and the center radiator is arranged between the left and right frame members, it is possible to arrange the left radiator and the right radiator by making use of the maximum width of the underframe and, at the same time, it is possible to extend the center radiator downwardly whereby the projection area of the whole radiator in the frontward direction of the vehicle body can be further increased thus enhancing the cooling ability of the radiator.

According to the sixth aspect, by forming the upper peripheral portion of the skid plate into an approximately large M shape in a front view, the end portions of the letter M, that is, the left and right ends of the upper portion and the left and right ends of the lower portion project. Accordingly, by covering the parts provided to the vehicle body, for example, the constitutional parts of the front suspensions with these portions, it is possible to effectively protect the constitutional parts of the front suspensions with the skid plate.

According to the seventh aspect, since the front ends of the front cushion units are covered with the crest portions of the letter M of the skid plate, it is possible to protect the front ends of the front cushion units with the skid plate whereby it is possible to prevent jumping stones or the like from hitting the front ends of the front cushion units.

According to the eighth aspect, since the skid plate is mounted on the front portion of the tapered front frame formed by casting, it is possible to firmly support the skid plate on the front frame whereby the vibrations of the skid plate or the like can be prevented.

According to the ninth aspect, since the front portions of the link members are covered with the skid plate, it is possible to surely protect the link members on which the large load acts from the lower arm sides by way of the rods whereby the reliability of the vehicle can be enhanced.

According to the tenth aspect, by providing the fender mounting portion, the seat support portion and the grab portion to the sub frame, the sub frame can be used for multiple purposes and hence, compared to the case in which the fender mounting portion, the seat support portion and the grab portion are provided separately, the present invention can reduce the number of parts and the number of assembling man-hours whereby the cost can be reduced.

According to the eleventh aspect, compared to the case in which the rear fender is laterally integrally formed, the present invention can miniaturize the left and right rear fenders and hence, the assembling property and the maintenance property can be enhanced.

According to the twelfth aspect, by providing the tail lamp support portion to the sub frame, compared to the case in which the tail lamp support portion is particularly provided, the number of parts can be reduced and hence, the cost can be reduced.

According to the thirteenth aspect, by arranging the muffler between the sub frame and the seat and, at the same time, by allowing the muffler to project between the sub frame and the rear end portion of the seat, it is possible to reduce portions which are exposed to the outside of the muffler and hence, the appearance can be enhanced.

According to the fourteenth aspect, by integrally forming the sub frame by casting, it is possible to easily form the sub frame and hence, the cost of sub frame can be reduced.

According to the fifteenth aspect, since the other end of the front cushion unit is connected with the suspension arm by way of the link member and the rod which extends in the substantially vertical direction, it is possible to smoothly convert the up-and-down movement of the suspension arm into the up-and-down movement of the rod which extends substantially vertically and, further, the up-and-down movement of the rod can be converted into the stroke of the front cushion unit in the front-to-rear direction of the vehicle whereby it is possible to effectively transmit the up-and-down movement of the suspension arm to the rod. Accordingly, it is possible to allow the front cushion unit to exhibit the maximum performance thus enhancing the traveling stability and the traveling performance on the unleveled road of the vehicle.

Further, with the use of the rod, it is possible to arrange the front cushion unit without being restricted by the position of the suspension arm and hence, the degree of freedom in the arrangement of the front cushion unit can be increased.

For example, by arranging the front cushion unit along the vehicle body frame and at the position close to the vehicle body frame, it is possible to reduce a projecting quantity of the front cushion unit from the vehicle body frame and hence, the vehicle becomes slim thus leading to the miniaturization and the compacting of the vehicle.

Further, by allowing the front cushion unit to be arranged close to the vehicle body frame, a mass of the front cushion unit can be concentrated on a center side of the vehicle and hence, the traveling performance such as the turning performance of the vehicle can be enhanced.

According to the sixteenth aspect, since the left and right rear cushion units are arranged substantially parallel to the vehicle body frame, it is possible to make the rear portion of the vehicle body slim whereby it is possible to enhance the easiness of getting on and off the vehicle and the appearance along with the miniaturization and the compacting of the vehicle.

According to the seventeenth aspect, since the reservoir tank is fitted and mounted in the hole portion formed in the rear cushion unit in the direction orthogonal to the axis, it is possible to provide the novel appearance to the rear cushion unit and hence, the product performance of the rear cushion unit can be enhanced.

According to the eighteenth aspect, since the rod is connected with the arm below the rod, it is possible to arrange the suspension structure at the lower position whereby it is possible to set the center of gravity at a low level.

DESCRIPTION OF THE PREFERRED EMBODIMENTS

Hereinafter, a preferred embodiment of the invention is explained in detail in conjunction with attached drawings. Here, the drawings are viewed in the direction of symbols.

Figure 1:
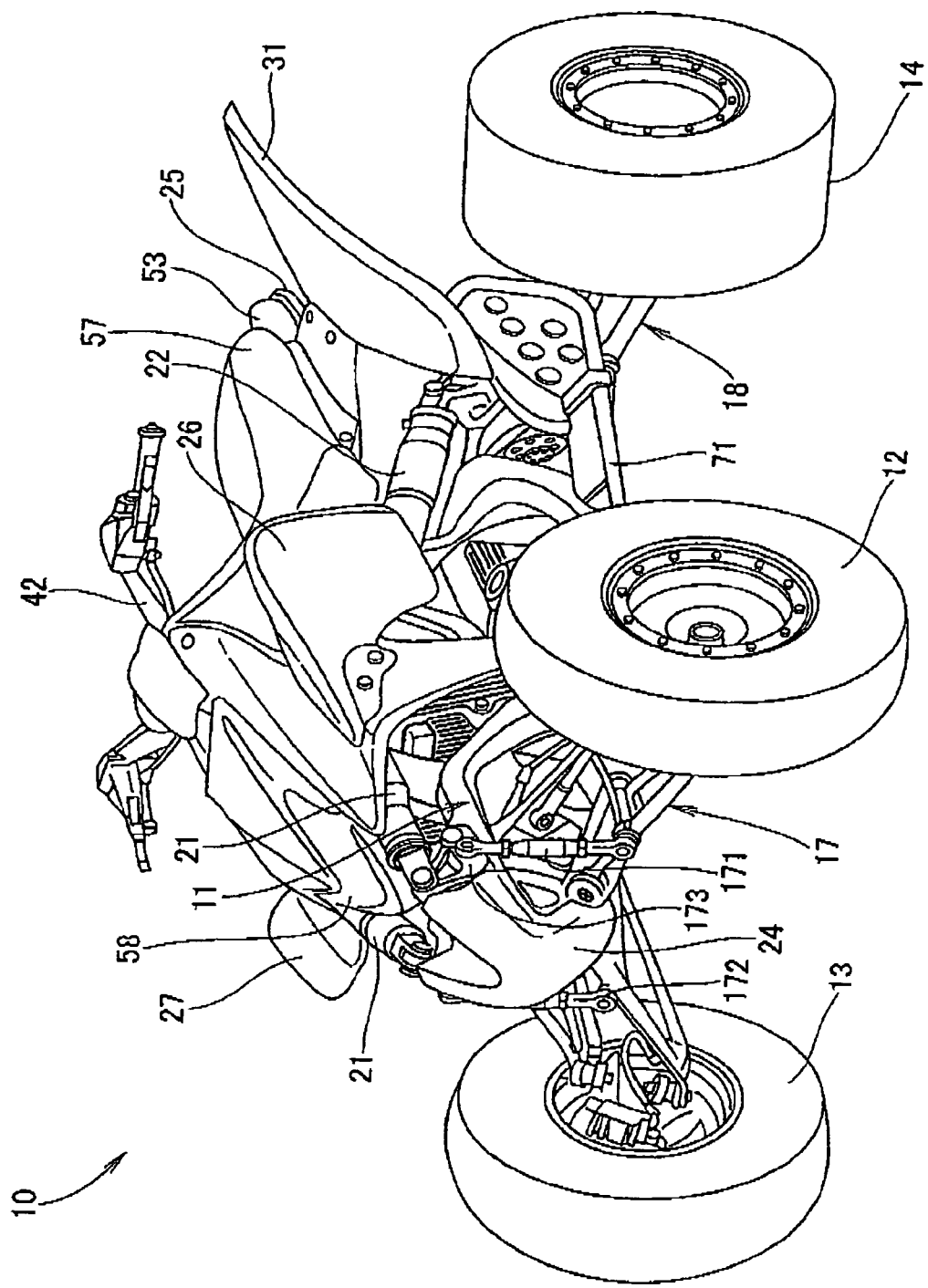
FIG. 1 is a perspective view showing a vehicle according to an embodiment of the present invention.

FIG. 1 is a perspective view showing a vehicle according to the embodiment. An all terrain vehicle 10 is a vehicle which has the following constitution. That is, a main portion of a vehicle body frame 11 is integrally formed in a truss shape. A double wishbone type independent suspension (to be more specific, a front suspension 17 for front wheels and a rear suspension 18 for rear wheels) which independently suspends the left and right front wheels 12, 13 and the left and right rear wheels 14, 15 (only one numeral 14 being shown) is provided with front cushion units 21, 21 and rear cushion units 22, 22 (only one numeral 22 being shown) which are respectively arranged along the vehicle body frame 11. A skid plate 24 which covers the vehicle body frame 11 and components which are provided to the vehicle body, that is, the vehicle mounting components is mounted on a front portion of the vehicle body frame 11. A sub frame 25 which has the multi-purpose structure is provided to a rear portion of the vehicle body frame 11. Front fenders 26, 27 which cover the front wheels 12, 13 from above and rear fenders 31, 32 (only one numeral 31 being shown) which cover the rear wheels 14, 15 from above constitute left and right separate parts.

Figure 2:
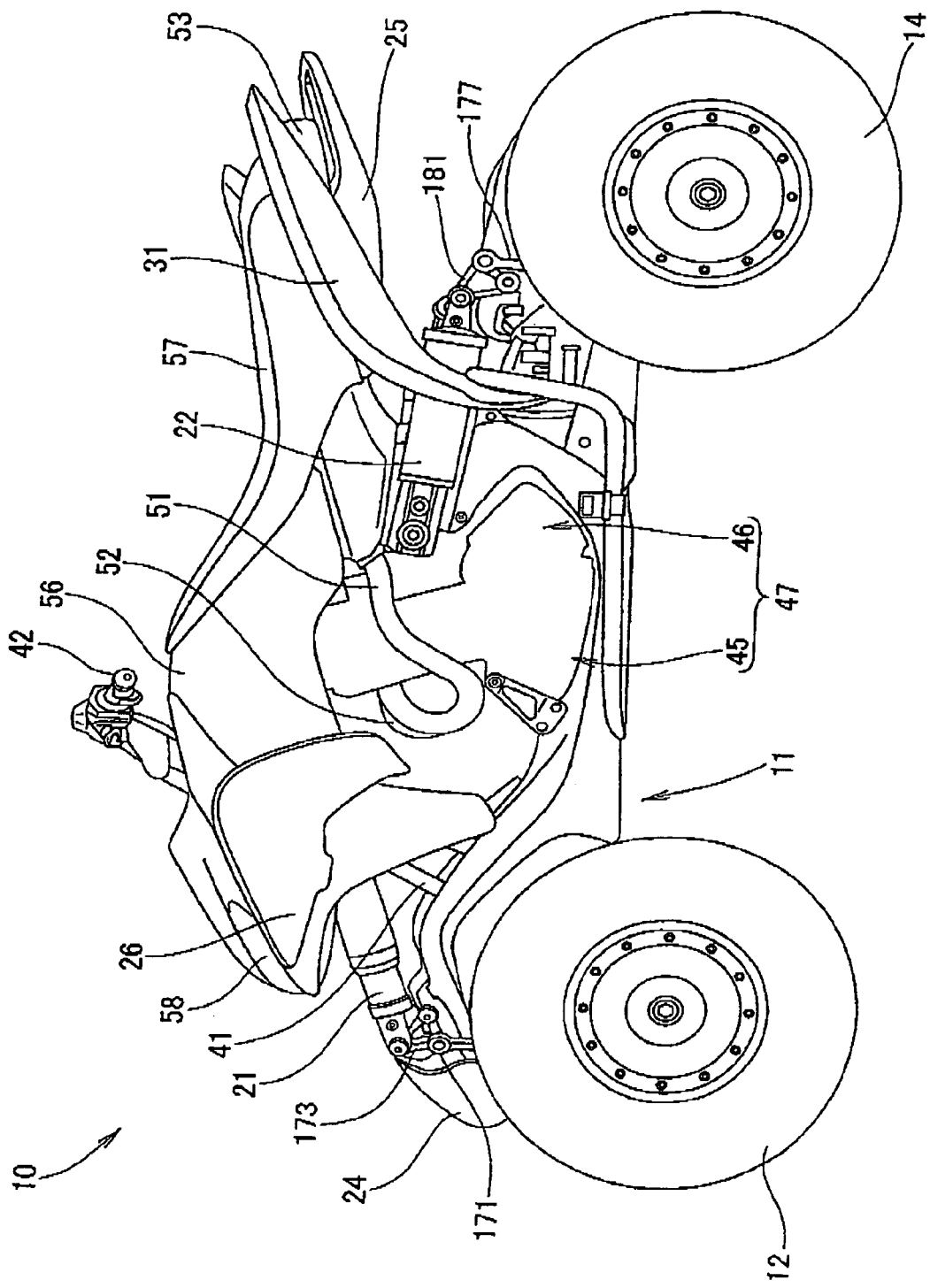
FIG. 2 is a side view showing the vehicle according to the embodiment.

FIG. 2 is a side view showing a vehicle according to the embodiment. The all terrain vehicle 10 is the vehicle having the following constitution. A steering shaft 41 for steering the front wheels 12, 13 (only the front-side numeral 12 being shown) is rotatably mounted on the front portion of the vehicle body frame 11. A bar handle 42 is mounted on an upper portion of the steering shaft 41. A power unit 47 which is constituted of an engine 45 and a transmission 46 is mounted on a center portion of the vehicle body frame 11. A pair of left and right exhaust pipes 51, 52 extends rearwardly from a front portion of the engine 45. Mufflers 53, 54 (only the front-side numeral 53 being shown) are respectively mounted on rear end sides of these exhaust pipes 51, 52. A fuel tank 56 is mounted above the engine 45. A sub frame 25 is arranged behind the engine 45. A seat 57 is arranged above the sub frame 25.

Figure 3:
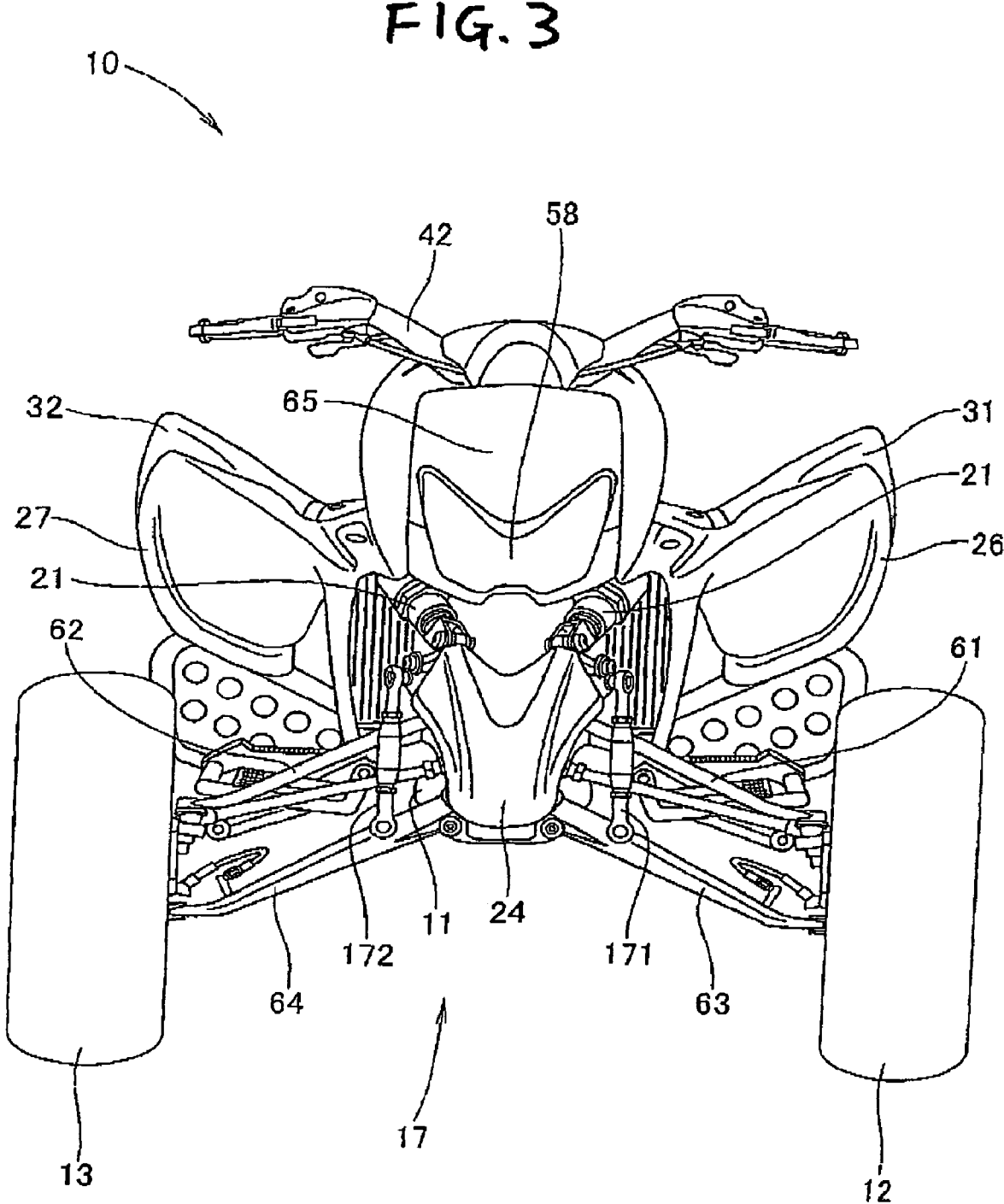
FIG. 3 is a front view showing the vehicle according to the embodiment.

FIG. 3 is a front view showing the vehicle according to the embodiment. The all terrain vehicle 10 is a vehicle having the following constitution. A head lamp 58 is mounted on a front center upper portion of the all terrain vehicle 10. Front fenders 26, 27 and rear fenders 31, 32 are respectively mounted on left and right sides of the vehicle body. A skid plate 24 having an approximately M shape in a front view is mounted on a front lower portion of the all terrain vehicle 10.

The front suspension 17 includes a pair of left and right upper arms 61, 62 and a pair of left and right lower arms 63, 64 which are vertically swingably mounted on the vehicle body frame 11.

Figure 4:
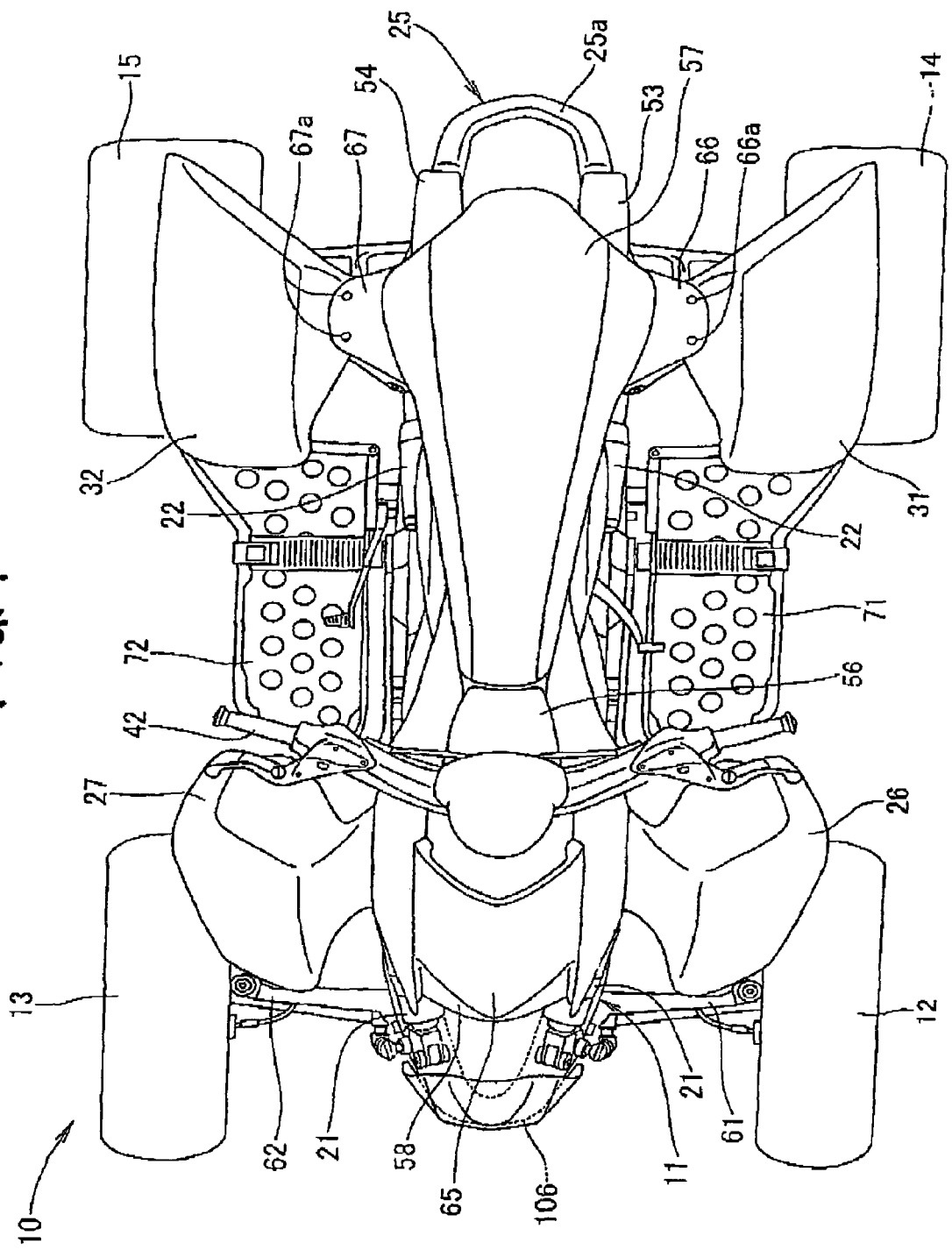
FIG. 4 is a plan view showing the vehicle according to the embodiment.

FIG. 4 is a plan view showing the vehicle according to the embodiment. The vehicle has the following constitution. The front fenders 26, 27 which constitute left and right separate bodies are mounted on a front cover 65 which is mounted on the front portion of the vehicle body. The rear fenders 31, 32 which constitute left and right separate bodies are respectively mounted on sideward projecting portions 66, 67 which are integrally formed with left and right sides of the sub frame 25. Steps 71, 72 on which a rider and a pillion passenger place their legs are mounted on left and right sides of the vehicle body frame 11 between the front fenders 26, 27 and the rear fenders 31, 32. Here, numerals 66a, 67a are bolts for mounting the rear fenders 31, 32 on the sideward projecting portions 66, 67.

The sub frame 25 is a member which has a rear end thereof formed in a U shape, wherein this U-shaped portion is a member which constitutes a grab rail 25a which the pillion passenger grabs with his/her hand to support his/her body.

Above the sub frame 25, the pair of left and right mufflers 53, 54 is positioned in an overlapping manner.

Figure 5:
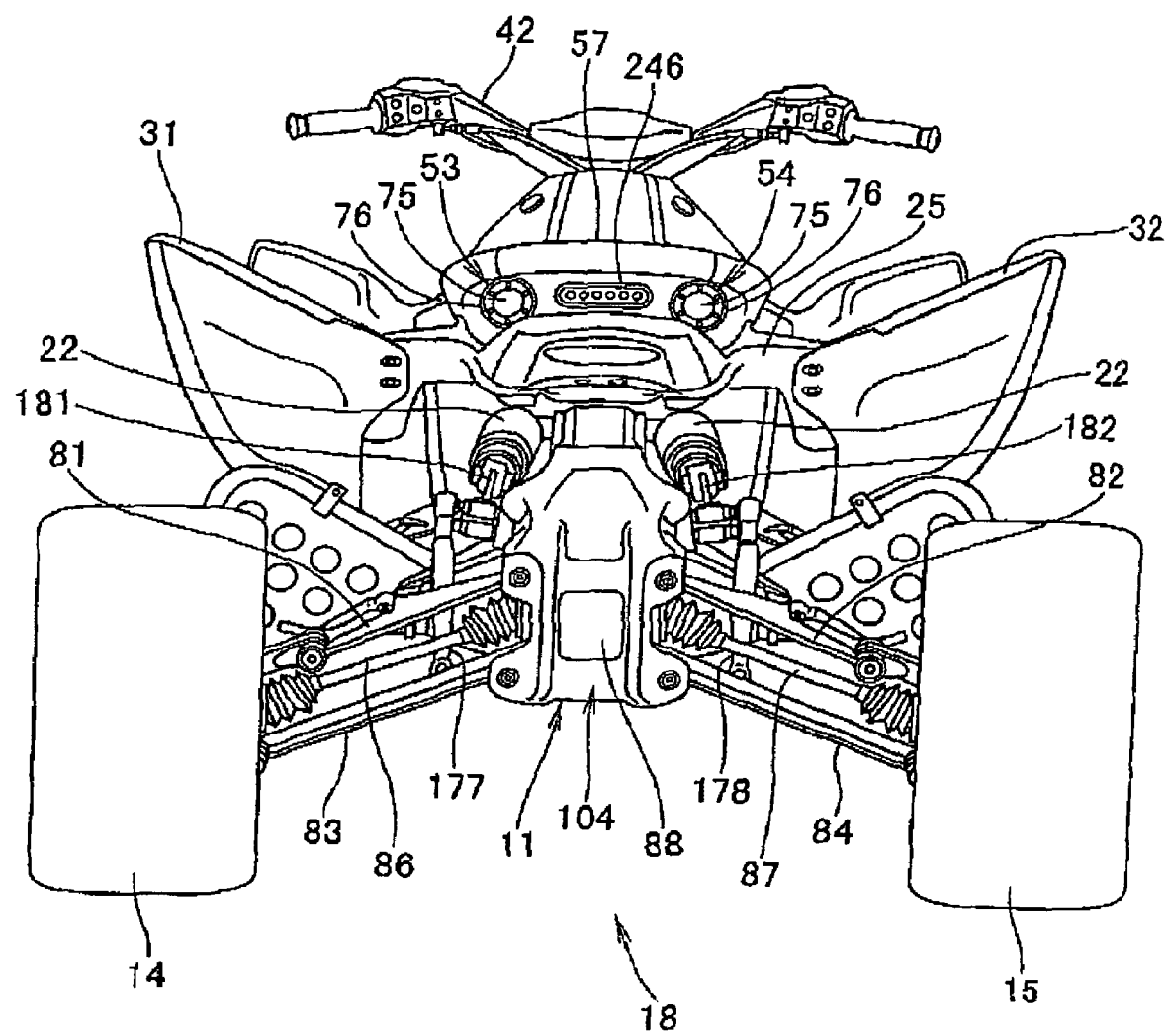
FIG. 5 is a back view showing the vehicle according to the embodiment.

FIG. 5 is a back view showing the vehicle according to the embodiment. Each muffler 53, 54 is constituted of a muffler body 75 which has a function of a silencer and a spark arrestor 76 which is a cylindrical member which surrounds the periphery of the muffler body 75 and prevents sparks generated by the muffler body 75 from scattering to the outside. Due to the provision of the spark arrestor 76, it is possible to make the transfer of the heat generated by the muffler body 75 to the outside difficult. Further, since the spark arrestor 76 is spaced apart from the muffler body 75, it is possible to suppress the temperature elevation of the spark arrestor 76 per se.

The rear suspension 18 includes a pair of left and right upper arms 81, 82 and a pair of left and right lower arms 83, 84 which are vertically swingably mounted on the vehicle body frame 11. Here, numerals 86, 87 indicate drive shafts which respectively drive the rear wheels 14, 15 and numeral 88 indicates a final drive assembly to which respective one ends of the drive shafts 86, 87 are connected.

Above the left and right rear cushion units 22, 22, a pair of left and right mufflers 53, 54 are positioned and hence, it is possible to obtain the favorable arrangement of the rear cushion units 22, 22 while ensuring the well-balanced appearance in a rearward view and a sufficient muffler capacity.

Figure 6:
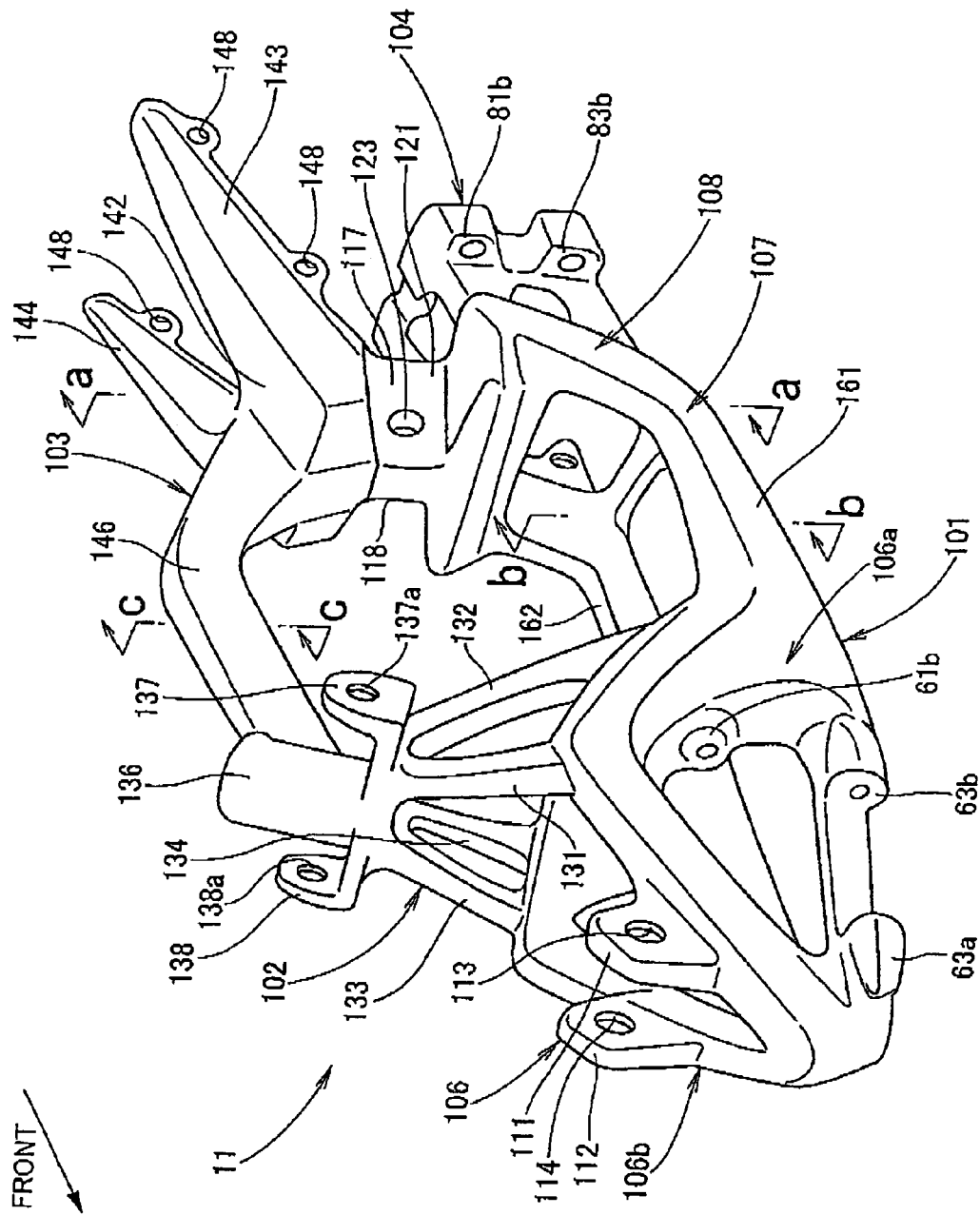
FIG. 6 is a perspective view showing a vehicle body frame of the vehicle according to the embodiment.

FIG. 6 is a perspective view showing the vehicle body frame of the vehicle according to the embodiment (an arrow "FRONT" in the drawing indicates the frontward direction of the vehicle, the same definition applicable hereinafter). The vehicle body frame 11 is constituted of an underframe 101 which has a front portion thereof formed in a truss shape (truss: frame structure which is assembled in a triangular shape), has a peaked shape and is integrally formed, a front upper frame 102 which is joined to an upper portion of a front portion of the underframe 101, a rear upper frame 103 which is joined to an upper portion of a rear portion of the underframe 101 and has a front end thereof joined to the front upper frame 102, the above-mentioned sub frame 25 which is connected to side portions of the rear upper frame 103 (see FIG. 2), and a rear frame 104 which is mounted on a rear portion of the underframe 101.

The underframe 101 is a member which is an integral body formed of a front frame portion 106 which is formed in a truss shape, an intermediate frame portion 107 which extends rearwardly from a rear portion of the front frame portion 106 in a state that the intermediate frame portion 107 is set lower than the front frame portion 106, and a rear frame portion 108 which is raised from a rear portion of the intermediate frame portion 107.

The front frame portion 106 is a member which has the following constitution. That is, front frame portion 106 has left and right portions thereof respectively formed in a truss shape. To these left and right truss-shaped portions 106a, 106b, suspension arms which constitute the front suspension 17 (see FIG. 3), that is, suspension arm mounting portions 61a, 61b, 62a, 62b (only numeral 61b being shown) which mount the upper arms 61, 62 (see FIG. 3) and suspension arm mounting portions 63a, 63b, 64a, 64b (only numeral 63a, 63b being shown) which mount the lower arms 63, 64 (see FIG. 3) are provided. Here, numerals 111, 112 indicate projecting portions which mount delta links described later which constitute the front suspension 17 thereon and numerals 113, 114 indicate shaft mounting holes for mounting swing shafts of the delta links.

The rear frame portion 108 is a portion which is provided with groove portions 117, 118 on left and right sides thereof, wherein the rear cushion units 22, 22 (see FIG. 4) are arranged in the groove portions 117, 118 respectively. In respective bottom portions 121, 122 (only one numeral being shown) of the groove portions 117, 118, cushion mounting holes 123, 123 (only one numeral 123 being shown) which mount one end of the rear cushion units 22, 22 therein are formed in a penetrating manner.

The front upper frame 102 is constituted of leg portions 131 to 134 which are joined to an upper portion of the underframe 101 so as to form a truss shape on left and right sides thereof, a handle post 136 which is integrally formed on upper portions of the leg portions 131 to 134 for rotatably supporting an upper portion of a steering shaft 41 (see FIG. 2), and a pair of left and right cushion unit support portions 137, 138 which are integrally formed on the upper portions of the leg portions 131 to 134 for supporting end portions of the front cushion units 21, 21 (see FIG. 2). Here, numerals 137a, 137b are rear cushion unit mounting holes.

The rear upper frame 103 is constituted of a base portion 142 which is joined to an upper portion of the rear portion of the underframe 101, a pair of left and right wing-shaped portions 143, 144 which are extended rearwardly from the base portion 142, and a connecting portion 146 which is jointed to the front upper frame 102 after being extended frontward oblique upper direction and thereafter being extended frontward oblique downward direction from the base portion 142. Here, numeral 148 indicates sub frame mounting holes (one out of two sub frame mounting portions 148 on the wing-shaped portion 144 side being not shown) for mounting the sub frame 25 (see FIG. 2).

The rear frame 104 is a member which has the following constitution. The rear frame 104 houses the final drive assembly 88 shown in FIG. 5. The rear frame 104 is provided with suspension arm mounting portions 81a, 81b, 82a, 82b (only numeral 81b being shown) which mount the upper arms 81, 82 (see FIG. 6) which constitute the rear suspension 18 and suspension arm mounting portions 83a, 83b, 84a, 84b (only numeral 83b being shown) which mount the lower arms 83, 84 (see FIG. 5).

Figure 7C:
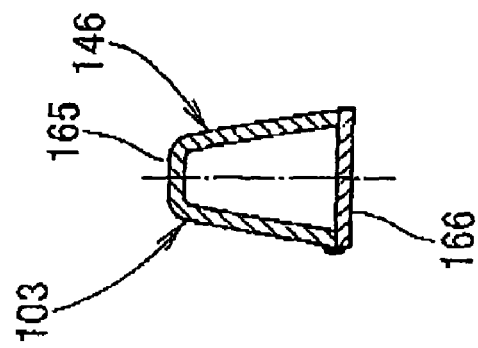
FIG. 7C is a cross-sectional view taken along a line c-c in FIG. 6.
Figure 7B:
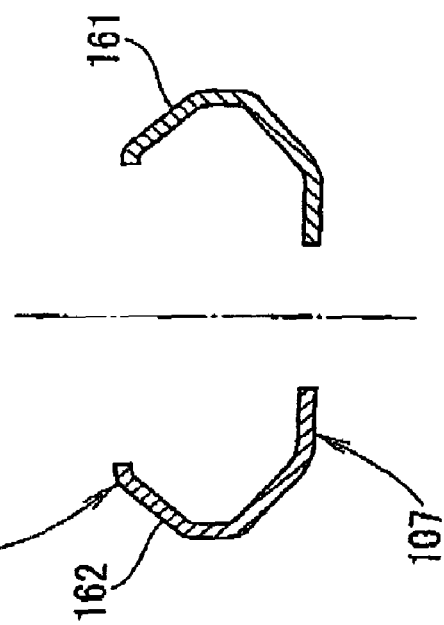
FIG. 7B is a cross-sectional view taken along a line b-b in FIG. 6.
Figure 7A:
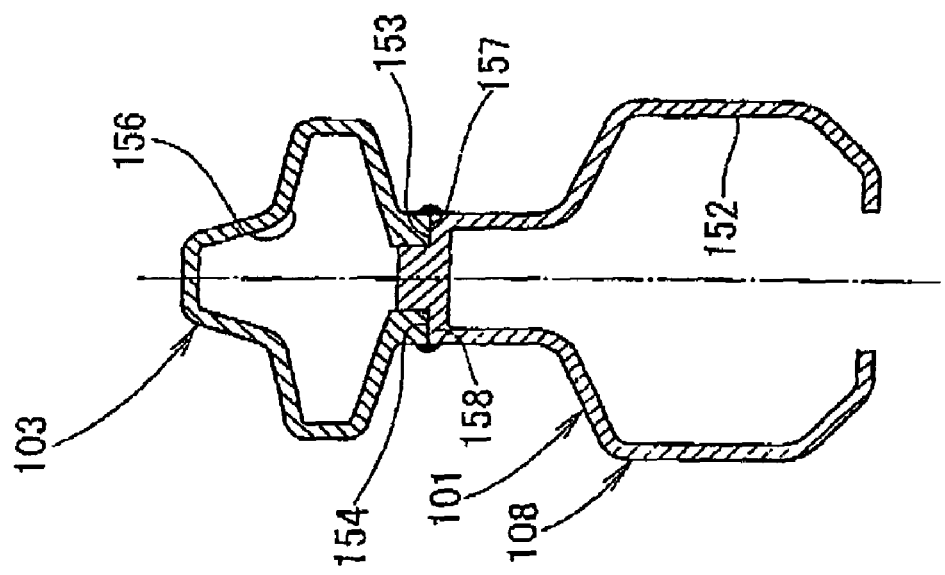
FIG. 7A is a cross-sectional view taken along a line a-a in FIG. 6.

FIG. 7A to FIG. 7C are cross-sectional views showing respective portions of the vehicle body frame of the vehicle according to the embodiment.

FIG. 7A is a cross-sectional view taken along a line a-a in FIG. 6, wherein the underframe 101 is a member which is formed in a left-and-right symmetry and includes a hollow portion 152 which opens downwardly. An upper portion of the underframe 101 includes shoulder portions 153, 154 to which the rear upper frame 103 is joined.

The rear upper frame 103 is a member which is formed in a left-and-right symmetry and includes a hollow portion 156 which opens downwardly, wherein left and right lower end portions 157, 158 are respectively joined to the shoulder portions 153, 154 of the underframe 101.

FIG. 7B is a cross-sectional view taken along a line b-b in FIG. 6, wherein an intermediate frame portion 107 of the underframe 101 is a member which is formed in a left-and-right symmetry and is constituted of a left frame 161 and a right frame 162. The left frame 161 and the right frame 162 have cross sections thereof formed in an approximately U shape.

FIG. 7C is a cross-sectional view taken along a line c-c in FIG. 6, wherein the connecting portion 146 of the rear upper frame 103 is constituted of an upper member 165 having an approximately U-shaped cross section and a flat-plate-like lower member 166 which is joined to a lower portion of the upper member 165.

Figure 8:
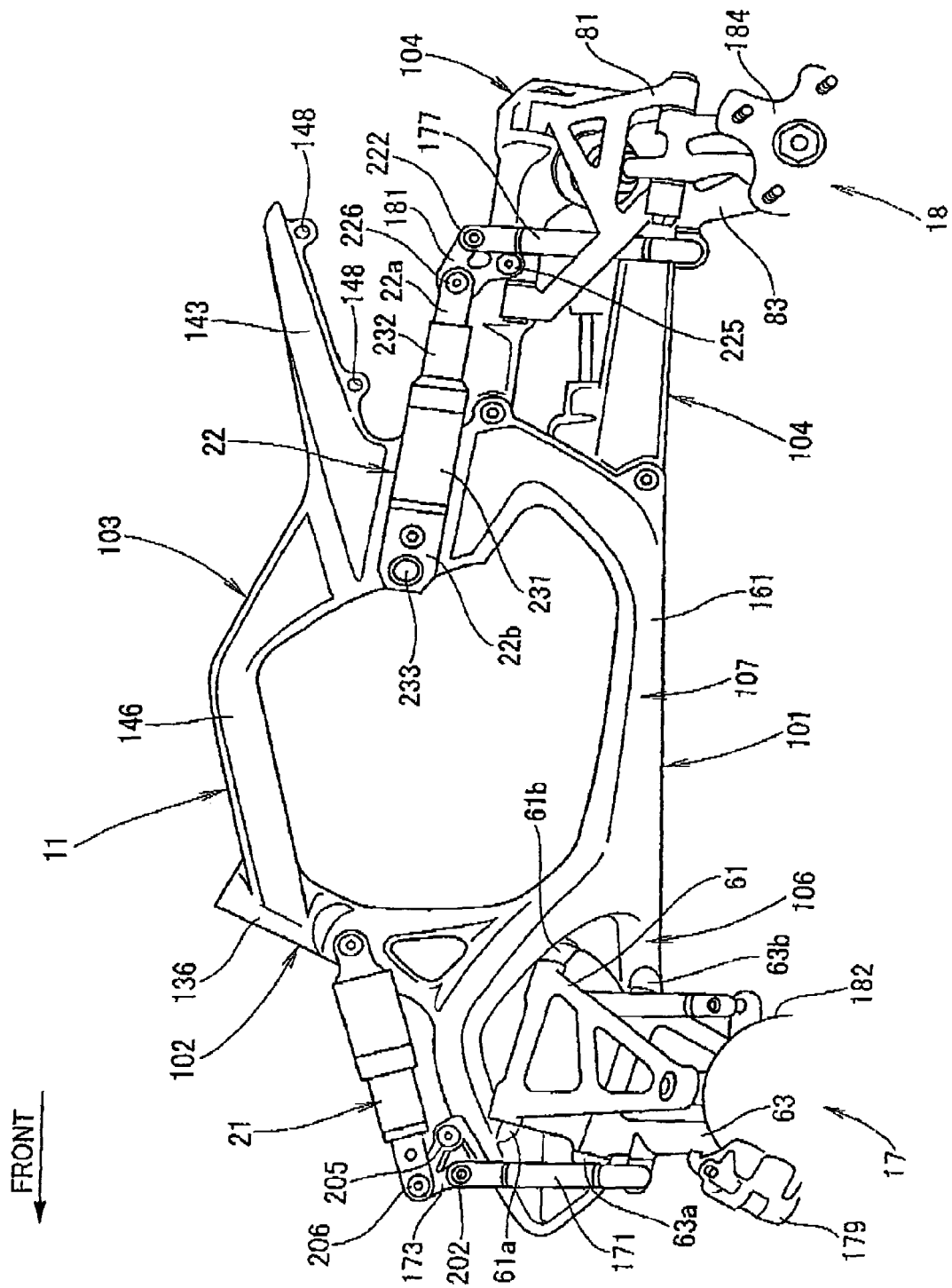
FIG. 8 is a side view showing the vehicle body frame and a suspension of the vehicle according to the embodiment.

FIG. 8 is a side view showing the vehicle body frame and the suspension of the vehicle according to the embodiment. The front suspension 17 includes the left and right upper arms 61, 62 (only the front numeral 61 being shown) and the left and right lower arms 63, 64 (only the front numeral 63 being shown), pushing rods 171, 172 (only the front numeral 171 being shown) which are swingably connected to front portions of the lower arms 63, 64, delta links 173, 174 (only the front numeral 173 being shown) which are connected to distal ends of the pushing rods 171, 172 and, at the same time, are swingably mounted on the underframe 101, the above-mentioned front cushion units 21, 21 (only the front numeral 21 being shown) which have one ends thereof connected with these delta links 173, 174, knuckles 175 (see FIG. 9) which are swingably connected with respective distal ends of the upper arms 61, 62 and the lower arms 63, 64, and hubs 176 (see FIG. 9) which are rotatably mounted on the knuckles 175, wherein the front wheels 12, 13 (see FIG. 4) are mounted on the hubs 176.

The front cushion units 21, 21 are arranged along substantially the vehicle body frame 11 in a side view.

The rear suspension 18 includes the left and right upper arms 81, 82 (only the front numeral 81 being shown) and the left and right lower arms 83, 84 (only the front numeral 83 being shown), pushing rods 177, 178 (only the front numeral 177 being shown) which are swingably connected to front portions of the lower arts 83, 84, delta links 181, 182 (only the front numeral 181 being shown) which are connected to distal ends of the pushing rods 177, 178 and, at the same time, are swingably mounted on the rear frame 104, the above-mentioned rear cushion units 22, 22 (only the front numeral 22 being shown) which have one ends thereof connected with these delta links 181, 182, knuckles 183 (see FIG. 9) which are swingably connected with respective distal ends of the upper arms 81, 82 and the lower arms 83, 84, and hubs 184,184 (only the front numeral 184, being shown) which are rotatably mounted on the knuckles 183, wherein the rear wheels 14, 15 (see FIG. 4) are mounted on the hubs 184, 184.

The rear cushion units 22, 22 are arranged along substantially the vehicle body frame 11 in a side view.

Here, numeral 179 indicates brake calipers which are mounted on the knuckles 183, and numeral 182 indicates brake discs which are mounted on the hubs 184.

The front cushion unit 21 and the rear cushion unit 22 are formed in an approximately truncated chevron shape in a side view and the shape contributes to the lowering of the center of gravity and enables the effective supporting of a jolting load from below the front and rear suspensions.

Figure 9:
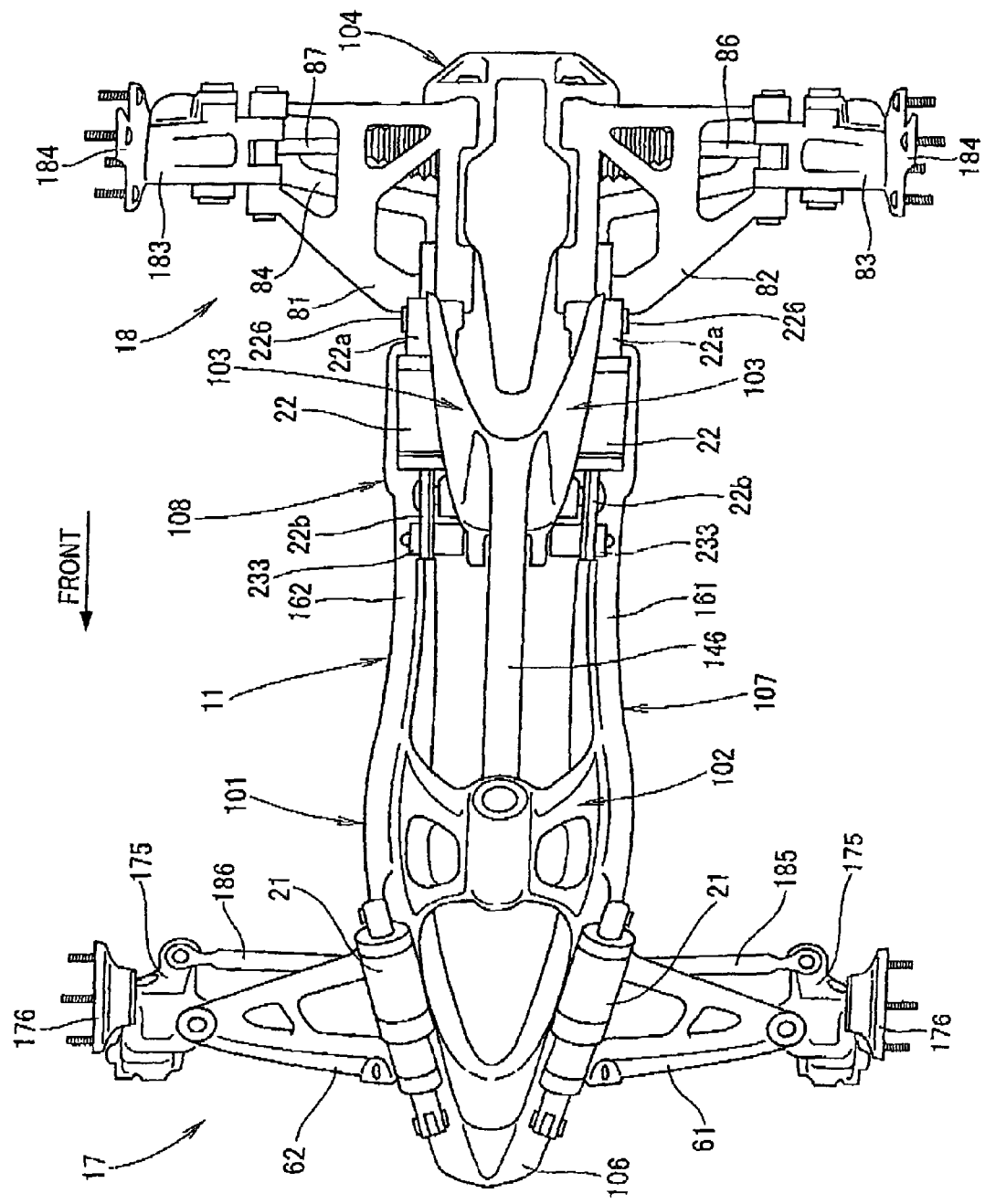
FIG. 9 is a plan view showing the vehicle body frame and a suspension of the vehicle according to the embodiment.

FIG. 9 is a plan view showing the vehicle body frame and the suspensions of the vehicle according to the embodiment. In the drawing, the front cushion units 21, 21 are arranged along the peaked front frame portion 106 of the underframe 101 in a state that the front cushion units 21, 21 have front end portions thereof arranged close to the center of the vehicle body than rear end portions along the peaked front frame 106 of the underframe 101. The rear cushion units 22, 22 are arranged along the rear frame portion 108 of the underframe 101 in a state that the rear cushion units 22, 22 extend in the substantially vehicle front-to-rear direction (that is, substantially parallel to the left and right rear cushion units 22, 22). Here, numerals 185, 186 indicate tie rods which have one ends thereof connected to a steering shaft 41 (see FIG. 2) and the other ends thereof connected to the left and right knuckles 175, 175.

In this manner, by arranging the front cushion units 21, 21 and the rear cushion units 22, 22 along the vehicle body frame 11 and close to the vehicle body frame 11, it is possible to suppress a projecting quantity of the front cushion units 21, 21 and the rear cushion units 22, 22 from the vehicle body frame 11 to a small value. Accordingly, it is possible to concentrate a mass of the front cushion units 21, 21 and the rear cushion units 22, 22 to a center side of the vehicle and hence, the traveling performance such as the turning performance of the all terrain vehicle 10 (see FIG. 4) can be enhanced, Further, the all terrain vehicle 10 can be made slim and hence, the get-on-and-off performance and the appearance can be enhanced. Still further, it is also possible to achieve the miniaturization and the compacting of the all terrain vehicle 10.

Figure 10:
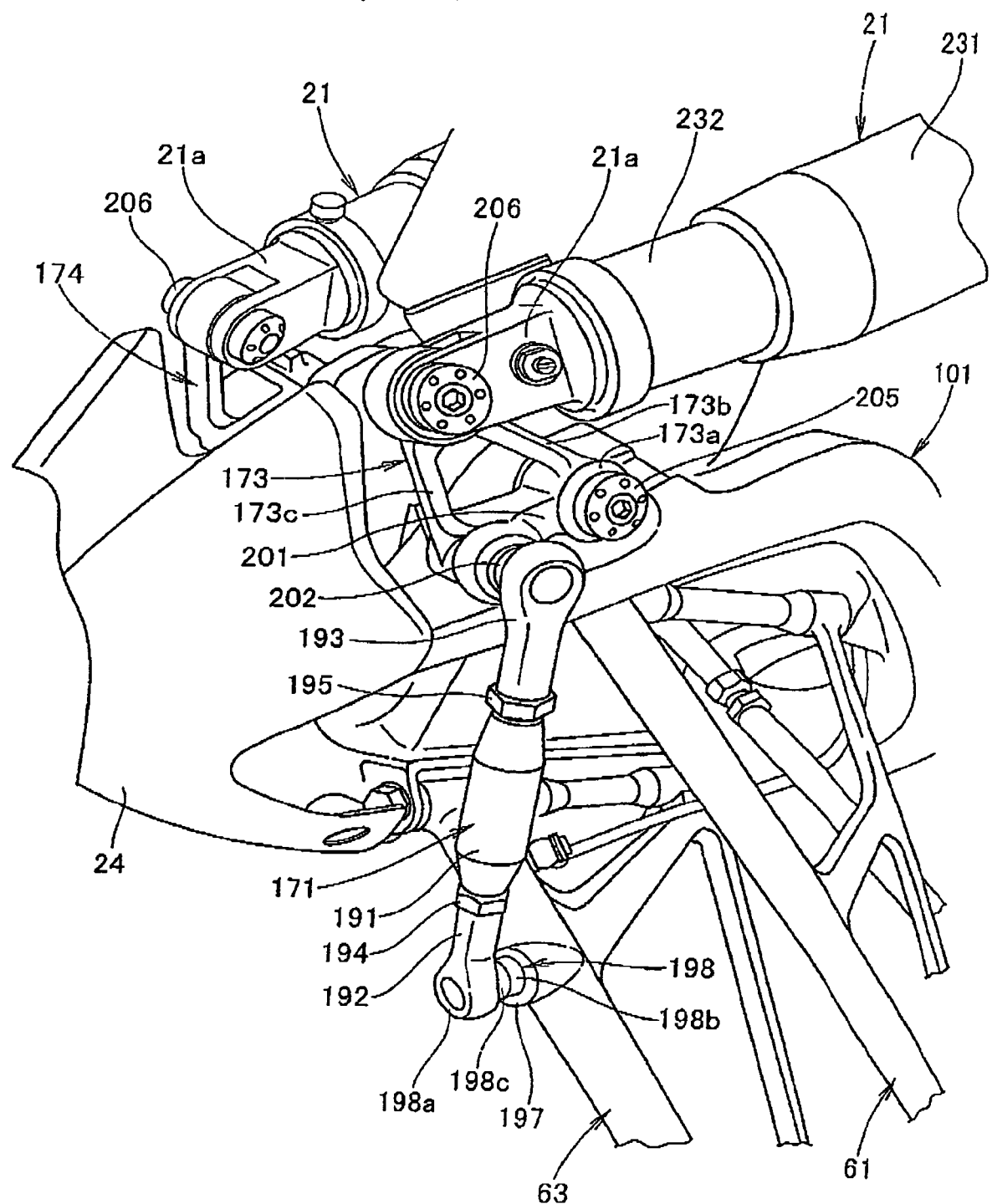
FIG. 10 is a perspective view showing a front portion of the vehicle according to the embodiment.

FIG. 10 is a perspective view showing the front portion of the vehicle according to the embodiment, wherein the pushing rod 171 is an extensible and shrinkable member which has the following constitution. That is, the pushing rod 171 is constituted of a rod 191, end portion members 192, 193 which are threadedly engaged with both end portions of the rod 191, and locking nuts 194, 195 which prevent the rotation of the end portion members 192, 193 relative to the rod 191. The pushing rod 171 is arranged to be able to extend in the substantially vertical direction in a state that the pushing rod 171 has one end thereof connected to a rod mounting portion 197 which is formed on a front portion of the lower arm 63 by way of a ball joint 198 and the other end thereof connected to a first arm portion 201 formed on the delta link 173 by way of a ball joint 202. Here, a pushing rod 172 (see FIG. 3) has the same structure as the pushing rod 171 and hence, the explanation thereof is omitted.

The ball joint 198 includes a socket 198a which is integrally formed on a distal end portion of the end portion member 192, a ball stud 198b which is integrally formed with a ball rotatably fitted in the inside of the socket 198a and is threadedly engaged with the rod mounting portion 197, and a dust cover 198c which prevents dusts from infiltrating respective fitting portions of the socket 198a and the ball stud 198b. Here, the ball joint 202 has the same structure as the ball joint 198 and hence, the explanation thereof is omitted.

The delta link 173 is swingably mounted in a shaft mounting hole 113 of the lower frame 101 (see FIG. 6) using a swing shaft 205 and is a triangular member which is constituted of a cylindrical bearing portion 173a which is mounted on a swing shaft 205, the above-mentioned first arm portion 201 which is integrally extended from the bearing portion 173a, a second arm portion 173b which is integrally extended from the bearing portion 173a in the same manner, and a connecting arm 173c which integrally connects distal ends of these first arm portion 201 and the second arm portion 173b.

The second arm portion 173b is a member which swingably mounts an end portion mounting portion 21a formed on one end of the front cushion unit 21 on a support shaft 206 formed on a distal end thereof. Here, the delta link 174 has the same structure as the delta link 173 and hence, the explanation thereof is omitted.

Further, the cushion unit support portion 137 of the above-mentioned front upper frame 102 shown in FIG. 6 is a portion on which an end portion mounting portion 21b formed on the other end of the front cushion unit 21 is mounted.

The skid plate 25 is a member which covers the above-mentioned delta links 173, 174, connecting portions between the delta links 173, 174 and the front cushion units 21, 21, swing shafts 205, connecting portions between the delta links 173, 174 and the pushing rods 171, 172 (only front numeral 171 being shown), proximal portions of the upper arms 61, 62 (only the front numeral 61 being shown) and proximal portions of the lower arms 63, 64 (only the front numeral 63 being shown).

Figure 11:
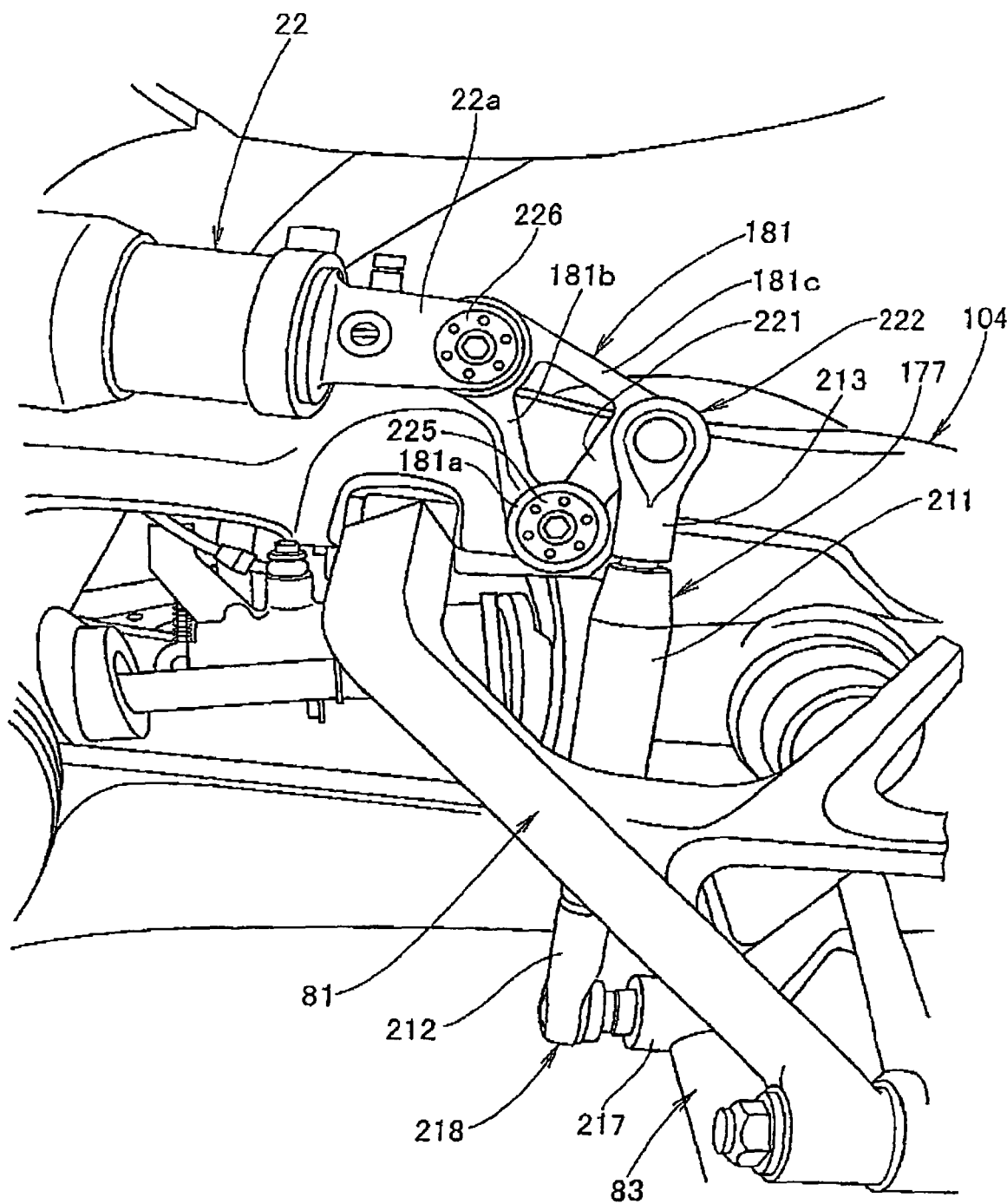
FIG. 11 is a perspective view showing a rear portion of the vehicle according to the embodiment.

FIG. 11 is a perspective view showing the rear portion of the vehicle according to the embodiment, wherein the pushing rod 177 is an extensible and shrinkable member which has the following constitution. That is, the pushing rod 177 is constituted of a rod 211, end portion members 212, 213 which are threadedly engaged with both end portions of the rod 211, and locking nuts 214 (not shown in the drawing) which prevent the rotation of the end portion member 212 relative to the rod 211. The pushing rod 177 is arranged to be able to extend in the substantially vertical direction in a state that the pushing rod 177 has one end thereof connected to a rod mounting portion 217 which is formed on a front portion of the lower arm 83 by way of a ball joint 218 and the other end thereof connected to a first arm portion 221 formed on the delta link 181 by way of a ball joint 222. Here, a pushing rod 178 (see FIG. 5) has the same structure as the pushing rod 177 and hence, the explanation thereof is omitted. Further, the ball joints 218, 222 have the same structure as the above-mentioned ball joints 198 (see FIG. 10) and hence, the explanation thereof is omitted.

The delta link 181 is swingably mounted in a shaft mounting hole (not shown in the drawing) of the rear frame 104 using a swing shaft 225 and is a triangular member which is constituted of a cylindrical bearing portion 181a which is fitted on a swing shaft 225, the above-mentioned first arm portion 221 which is integrally extended from the bearing portion 181a, a second arm portion 181b which is integrally extended from the bearing portion 181a in the same manner, and a connecting arm 181c which integrally connects distal ends of these first arm portion 221 and the second arm portion 181b.

The second arm portion 181b is a member which swingably mounts an end portion mounting portion 22a formed on one end of the rear cushion unit 22 on a support shaft 226 formed on a distal end thereof. Here, the delta link 182 (see FIG. 5) has the same structure as the delta link 181 and hence, the explanation thereof is omitted.

Figure 12:
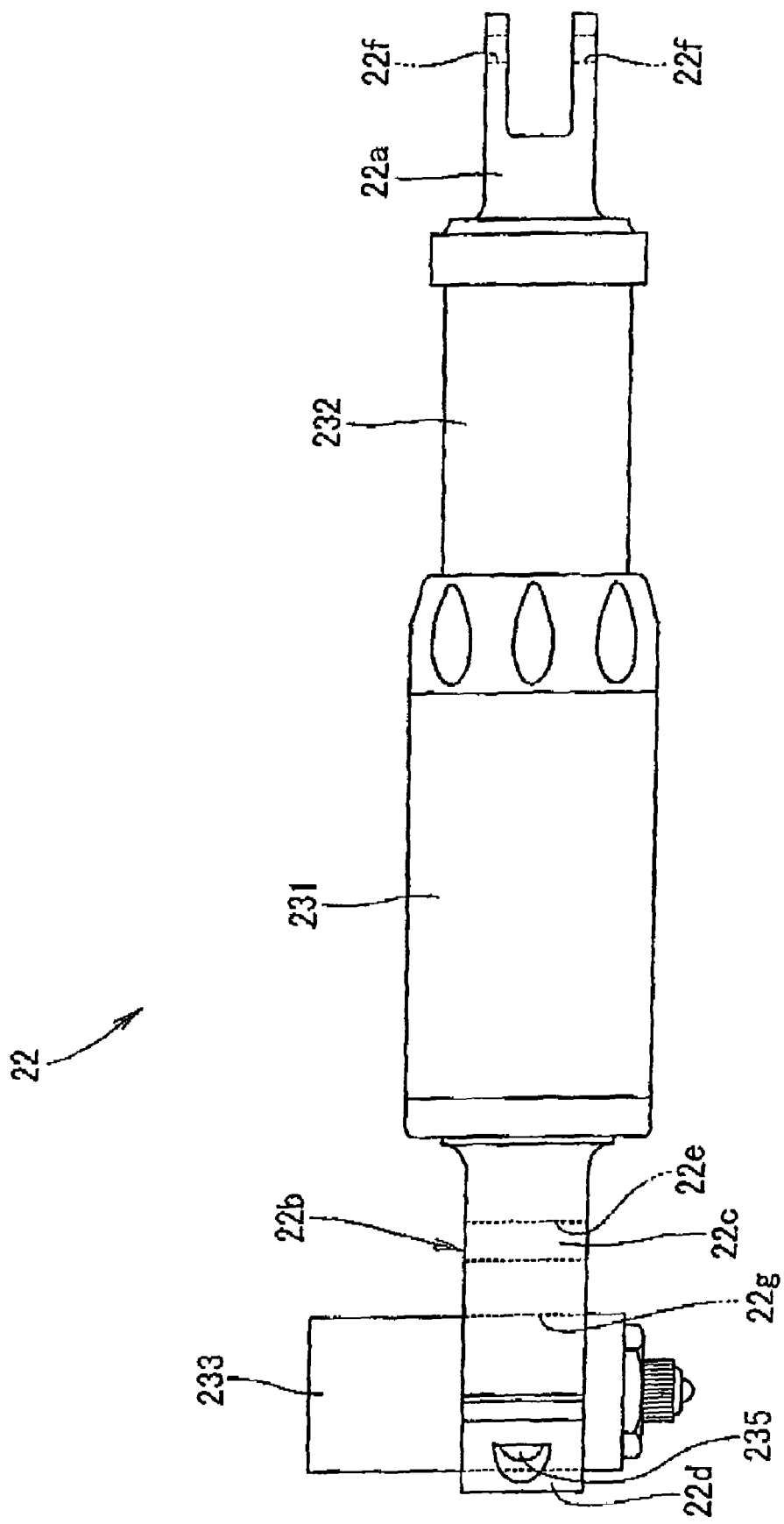
FIG. 12 is a plan view showing a rear cushion unit of the vehicle according to the embodiment.

FIG. 12 is a plan view showing the rear cushion unit on the left side of the vehicle according to the embodiment, wherein the rear cushion unit 22 includes an outer tube 231, an inner tube 232 which is slidably inserted into the inside of the outer tube 231, end portion mounting portions 22a, 22b which are provided to respective end portions of the outer tube 231 and the inner tube 232, and an approximately columnar reservoir tank 233 which is mounted on the end portion mounting portion 22b. Here, the right-side rear cushion unit 22 also has the same structure as the left-side rear cushion unit 22.

The end portion mounting portion 22b is constituted of a mounting portion body 22c and a cap member 22d which is mounted on the mounting portion body 22c using two bolts 235, 235 (only the front numeral 235 being shown). The mounting portion body 22c is a portion where a piston rod (not shown in the drawing) which extends to the inside of the outer tube 231 is mounted, wherein a piston (not shown in the drawing) which is mounted on a distal end of the piston rod is slidable on an inner surface of the inner tube 232. Here, numeral 22e indicates a bolt inserting hole in which a bolt which mounts the end mounting portion 22b in the cushion mounting hole 123 (see FIG. 6) formed in the underframe 101 (see FIG. 6) is inserted, and numerals 22f, 22f indicate support shaft inserting holes in which the support shafts 226 (see FIG. 11) for mounting the end portion mounting portions 22a on the support shaft 226 (see FIG. 11) of the delta link 181 (see FIG. 11) are inserted.

The reservoir tank 233 is a tank in which oil which is filled into or discharged from the outer tube 231 and the inner tube 232 is stored. The reservoir tank 233 is a member which is fitted in and fixed to a hole portion 22g which is formed extending over the mounting portion body 22c of the end portion mounting portion 22b and the cap member 22d, that is, a member which is fixed by being sandwiched by the mounting portion body 22c and the cap member 22d.

The above-mentioned front cushion unit 21 (see FIG. 10) differs from the above-mentioned rear cushion unit 22 merely, for example, with respect to the shape of the end portion mounting portion 22b and that the front cushion unit 21 is not provided with the reservoir tank 233. That is, the front cushion unit 21 has the same structure as the rear cushion unit 22 with respect to other portions.

Figure 13:
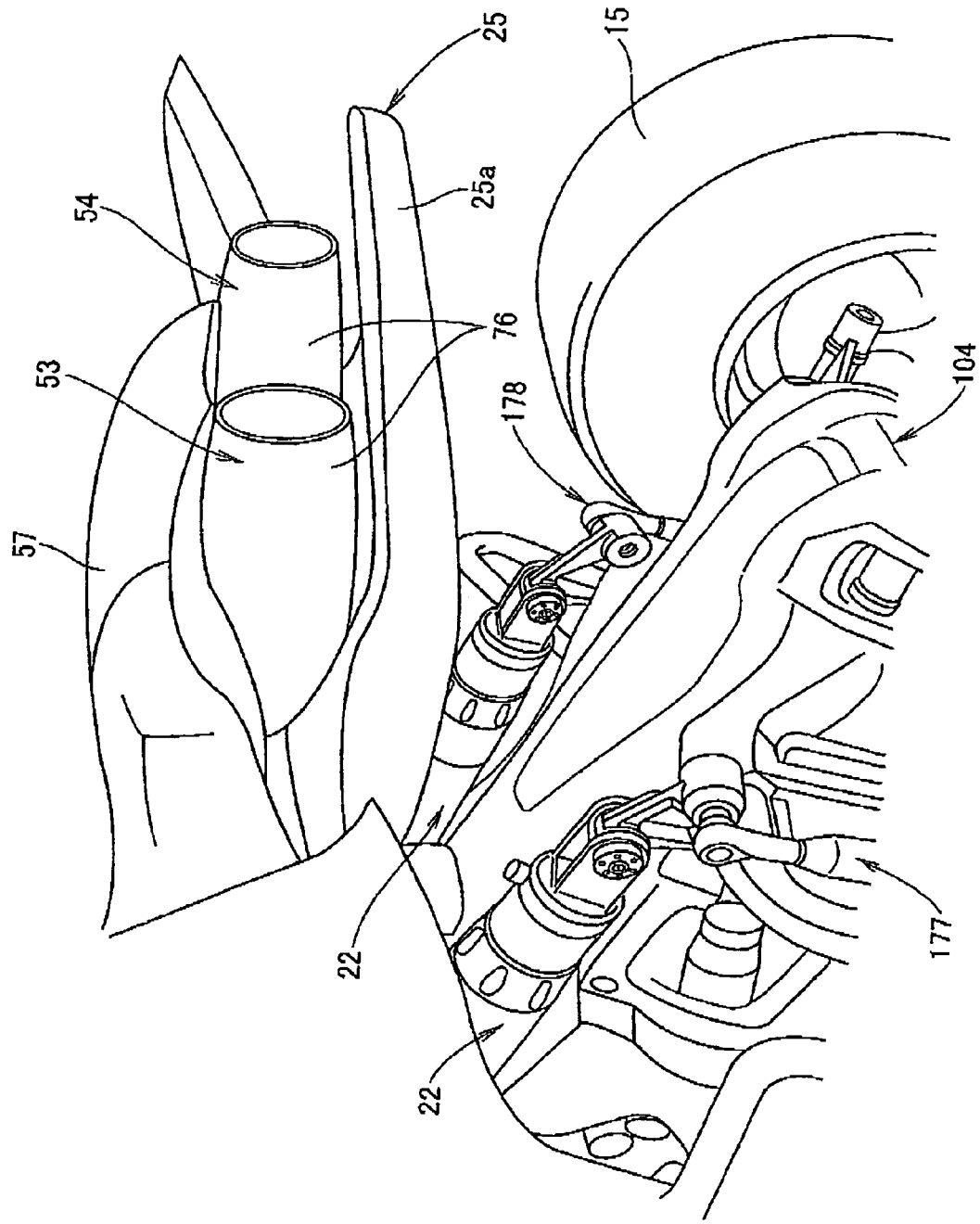
FIG. 13 is a perspective view showing a rear end portion of the vehicle according to the embodiment.

FIG. 13 is a perspective view showing the rear end portion of the vehicle according to the embodiment. As shown in the drawing, mufflers 53, 54 are arranged on left and right sides above the sub frame 25 and the seat 57 is arranged above these mufflers 53, 54.

By arranging the mufflers 53, 54 between the sub frame 25 and the seat 57 in this manner, portions of the mufflers 53, 54 which are exposed to the outside can be reduce and hence, the appearance can be enhanced.

Since the sub frame 25 is a member which also functions as a seat rail which supports the seat 57, it is not necessary to particularly provide the seat rail and hence, the number of parts can be reduced and the cost can be reduced.

Figure 14:
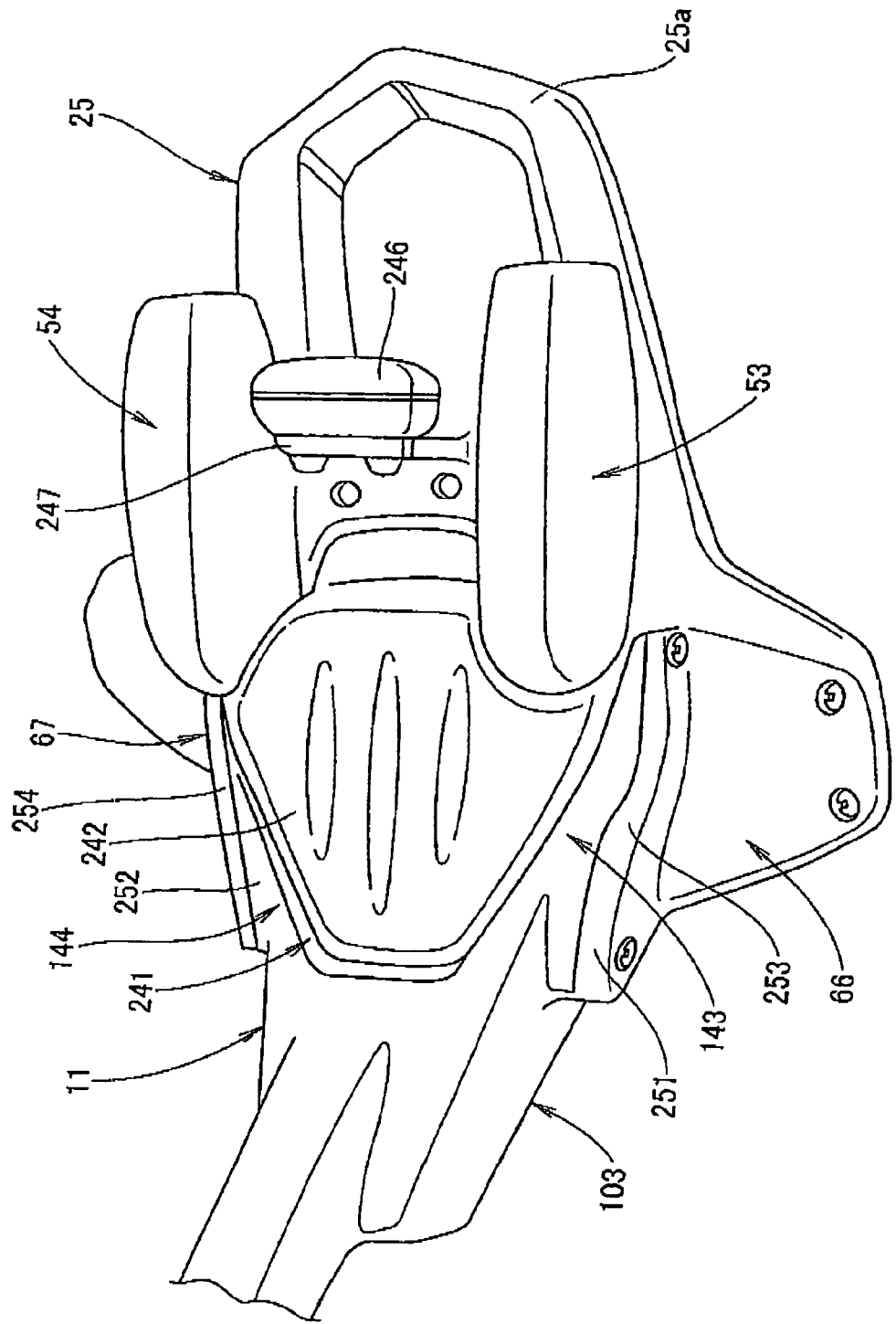
FIG. 14 is a perspective view showing the vehicle body frame and exhaust system parts of the vehicle according to the embodiment.

FIG. 14 is a perspective view showing the vehicle body frame and exhaust system parts of the vehicle according to the embodiment. As shown in the drawing, in a space 241 defined at a portion where the rear upper frame 103 of the vehicle body frame 11 and the sub frame 25 are joined, an exhaust chamber 242 which is connected between rear ends of the exhaust pipes 51, 52 (see FIG. 2) and the mufflers 53, 54 is arranged. A pair of left and right sideward projecting portions 66, 67 which mount the rear fenders 31, 32 (see FIG. 4) thereon and a tail lamp mounting portion 247 which mounts a tail lamp 246 thereon are integrally mounted on the sub frame 25. The mufflers 53, 54 are mounted on the sub frame 25. Here, numerals 251, 252 indicate sub frame mounting portions which are integrally mounted on side portions of wing-shaped portions 143, 144 of the rear upper frames 103 in a projecting manner for mounting the sub frame 25, numeral 253, 254 indicate upper frame connecting portions which are integrally mounted on the inner side of the front portion of the sub frame 25 in a projecting manner to be connected to the rear upper frame 103.

The grab rail 25a is mounted on the rear end of the body frame and hence, the grab rail 25a is effectively used for pushing and pulling the vehicle.

The exhaust chamber 242 is provided for attenuating exhaust noises by expanding a volume of an exhaust gas which passes through the exhaust pipes 51, 52 and can enhance a sound dampening effect together with the mufflers 53, 54.

Figure 15:
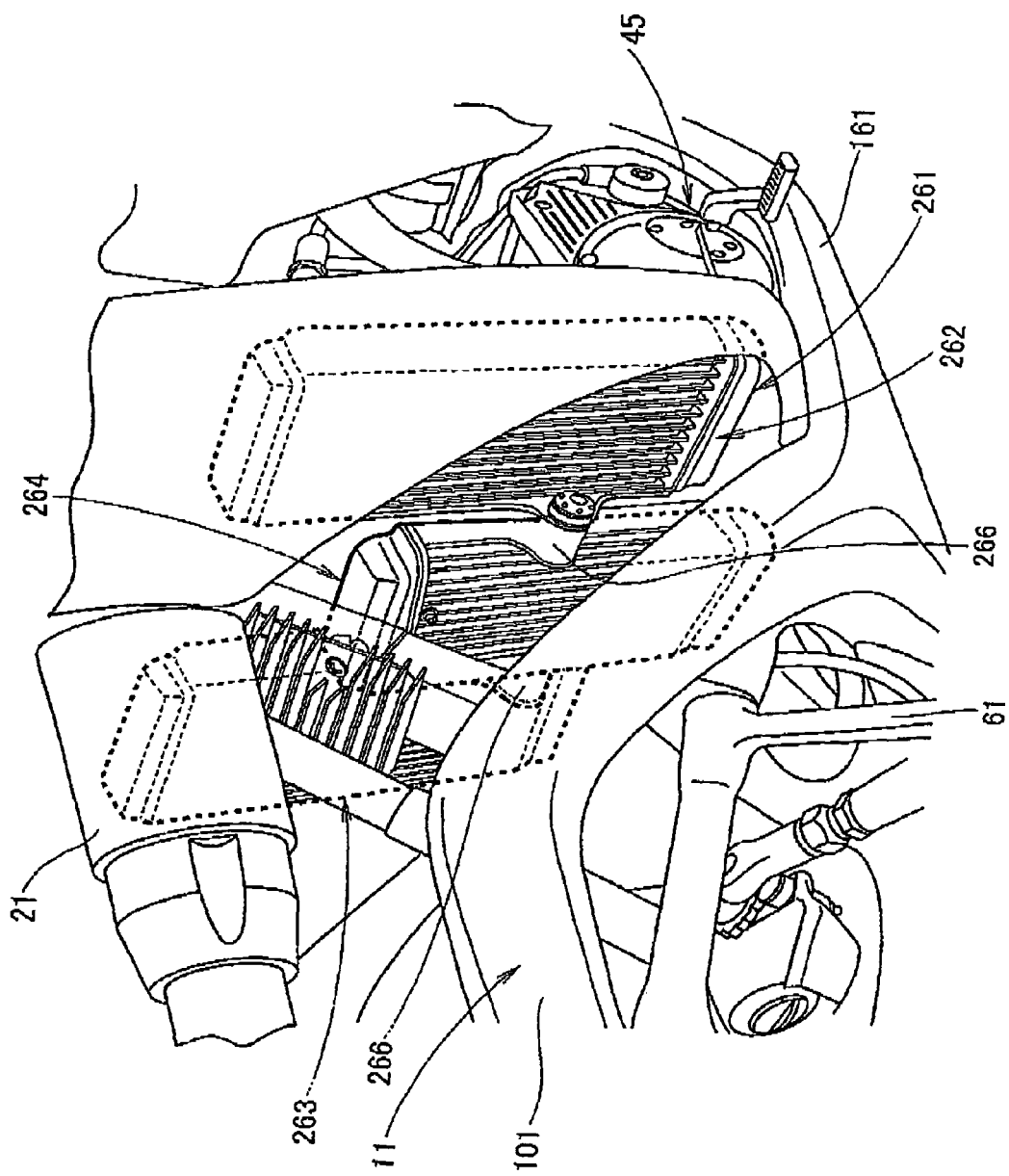
FIG. 15 is a perspective view showing a lower portion of a front portion of the vehicle according to the embodiment.

FIG. 15 is a perspective view showing a lower portion of the front portion of the vehicle according to the embodiment. As shown in the drawing, a radiator 261 which is split in three is arranged in the inside of the underframe 101 of the vehicle body frame 11.

The radiator 261 is constituted of a left radiator 262 and a right radiator 263 which are respectively arranged above a left frame 161 and a right frame 162 of the underframe 101 (see FIG. 6), and a center radiator 264 which is arranged between these left radiator 262 and the right radiator 263 and, at the same time, between the left frame 161 and the right frame 162. These left radiator 262, the right radiator 263 and the center radiator 264 are connected with each other by way of connecting portions 266, 266.

For example, when the radiator is constituted of a single body, a projection area of the radiator in the frontward direction of the vehicle receives the restriction due to a shape of the vehicle body frame 11. Compared to such a case, according to the present invention, the left radiator 262 and the right radiator 263 are arranged by making full use of the width of the lower frame 101 and, at the same time, the center radiator 264 is extended downwardly between the left frame 161 and the right frame 162 thus skillfully avoiding the lower frame 101 whereby the projection area of the radiator 261 can be further increased by making the reception of restriction on the projection area of the radiator 261 in the frontward direction difficult. Accordingly, it is possible to enhance the cooling ability of the radiator 261.

Further, by setting an upper end of the center radiator 264 lower than upper ends of the left radiator 262 and the right radiator 263, it is also possible to make use of a space above the center radiator 264.

Figure 16:
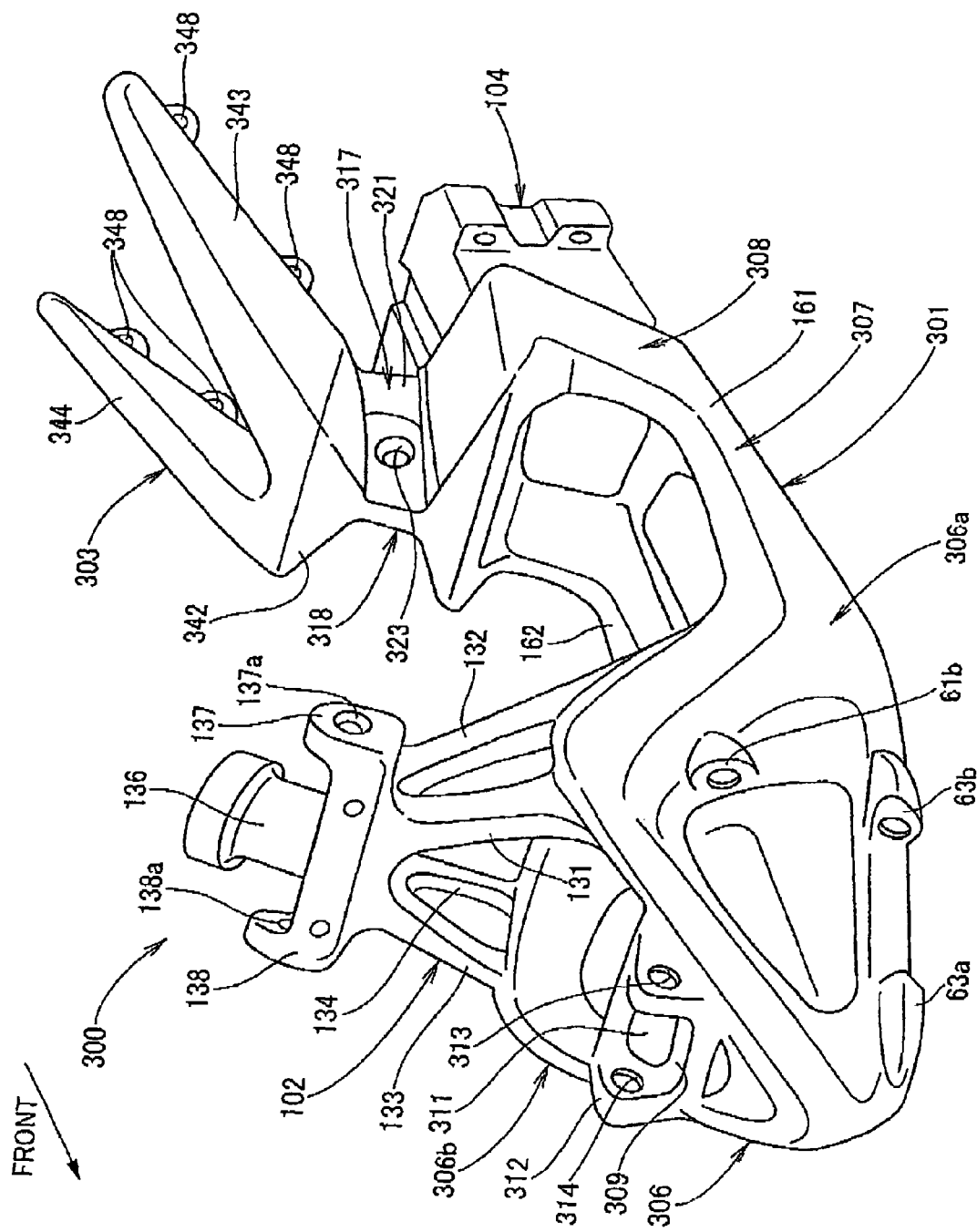
FIG. 16 is a perspective view showing another embodiment of the vehicle body frame of the vehicle according to the present invention.

FIG. 16 is a perspective view showing another embodiment of the vehicle body frame of the vehicle according to the present invention. The vehicle body frame 300 is constituted of an underframe 301 which has a front portion thereof formed in a truss shape, has a peaked shape and is integrally formed, a front upper frame 102 which is joined to an upper portion of a front portion of the underframe 301, a rear upper frame 303 which is joined to an upper portion of a rear portion of the underframe 301, the above-mentioned sub frame 25 which is connected to side portions of the rear upper frame 303 (see FIG. 2), and a rear frame 104 which is mounted on a rear portion of the underframe 301.

The underframe 301 is a member which is an integral body formed of a front frame portion 306 which is formed in a truss shape, an intermediate frame portion 307 which extends rearwardly from a rear portion of the front frame portion 306 in a state that the intermediate frame portion 307 is set lower than the front frame portion 306, and a rear frame portion 308 which is raised from a rear portion of the intermediate frame portion 307.

The front frame portion 306 is a member which has the following constitution. That is, the front frame portion 306 has left and right portions thereof respectively formed in a truss shape. These left and right truss-shaped portions 306a, 306b are integrally connected with each other by cross members 309, 309. Further, to these portions 306a, 306b, suspension arms which constitute the front suspension 17 (see FIG. 3), that is, suspension arm mounting portions 61a, 61b, 62a, 62b (only numeral 61b being shown) which mount the upper arms 61, 62 (see FIG. 3) and suspension arm mounting portions 63a, 63b, 64a, 64b (only numeral 63a, 63b being shown) which mount the lower arms 63, 64 (see FIG. 3) are provided. Here, numerals 311, 312 indicate projecting portions which are mounted on cross members 309, 309 which are provided for mounting delta links 173, 174 (see FIG. 3) thereon, and numerals 313, 314 indicate shaft mounting holes for mounting swing shafts 205 (see FIG. 10) described later of the delta links 173, 174.

The rear frame portion 308 is a portion which is provided with groove portions 317, 318 on left and right sides thereof, wherein the rear cushion units 22, 22 (see FIG. 4) are arranged in the groove portions 317, 318 respectively. In respective bottom portions 321, 322 (only one numeral being shown) of the groove portions 317, 318, cushion mounting holes 323, 323 (only one numeral 323 being shown) which mount one end of the rear cushion units 22, 22 therein are formed in a penetrating manner.

The rear upper frame 303 includes a base portion 342 which is joined to an upper portion of a rear portion of the underframe 301 and a pair of left and right wing-like portions 343, 344 which are extended rearwardly from the base portion 342. Here, numeral 348 indicates sub frame mounting holes for mounting the sub frame 25 (see FIG. 2).

As has been explained in conjunction with FIG. 3, FIG. 4 and FIG. 6, the front frame portion 106 which constitutes the front portion of the underframe 101 which constitutes the lower portion of the vehicle body frame 11 is formed in a triangular shape, more specifically, a truss shape and, at the same time, the front frame portion 106 of the underframe 101 is formed in a peaked shape in a plan view, and the underframe 101 is integrally formed by casting.

Since the front frame portion 106 of the underframe 101 is formed in a triangular shape, it is possible to enhance the rigidity of the front frame portion 106 whereby it is possible to firmly support the suspension arms (that is, the upper arms 61, 62 and the lower arms 63, 64) and the front cushion units 21, 21 on the front frame portion 106. Further, the underframe 101 is integrally formed by casting and hence, the appearance of the portions which are exposed to the outside can be enhanced whereby the merchantability of all terrain vehicle 10 can be enhanced. Further, by integrally forming the underframe 101 by casting, it is possible to achieve the cost reduction of the vehicle body frame 11.

Further, the underframe 101 mounts the upper arms 61, 62 and the lower arms 63, 64 which support left and right front wheels 12, 13 on left and right sides of the truss-shaped front frame portion thereof respectively, and the front cushion units 21, 21 which absorb an impact transmitted to the vehicle body frame 11 by way of these upper arms 61, 62 and lower arms 63, 64 are arranged to be extended in the substantially front-to-rear direction along the vehicle body frame 11.

Since the upper arms 61, 62 and lower arms 63, 64 are supported on the front frame portion 106 of the underframe 101 having the high rigidity, it is possible to enhance the supporting rigidity of the upper arms 61, 62 and lower arms 63, 64. Further, since the left and right front cushion units 21, 21 are arranged along the vehicle body frame 11, it is possible to concentrate a mass of the front cushion units 21, 21 at the vehicle center side whereby the traveling performance such as the turning property of the all terrain vehicle 10 can be enhanced.

Further, as explained in conjunction with FIG. 1, FIG. 8 and FIG. 10, the front cushion units 21, 21 have one ends thereof mounted on the vehicle body frame 11 side and the other ends thereof connected to the delta links 173, 174 which constitute the link members which are swingably mounted on the vehicle body frame 11 by way of the swing shafts 205 which constitute pivot portions, and these delta links 173, 174 are connected with the lower arms 63, 64 by way of the pushing rods 171, 172.

The respective other-end sides of the front cushion units 21, 21 are connected to the delta links 173, 174 and the delta links 173, 174 are connected with the lower arms 63, 64 by way of the pushing rods 171, 172 and hence, it is possible to increase the degree of freedom of the arrangement of the front cushion units 21, 21 by the pushing rods 171, 172 whereby, for example, the front cushion units 21, 21 can be arranged along the vehicle body frame 11 thus constituting the all terrain vehicle 10 in a slim, miniaturized and compact manner and enhancing the getting-on-and-off property and the appearance.

Further, the skid plate 24 which covers the underframe 101 is provided in front of the underframe 101, and the skid plate 24 is formed into a substantially M shape in a front view so as to allow the skid plate 24 to cover the swing shafts 205, the suspension arm mounting portions 61a, 61b, 62a, 62b and the suspension arm mounting portions 63a, 63b, 64a, 64b.

Since the swing shafts 205, the suspension arm mounting portions 61a, 61b, 62a, 62b, and the suspension arm mounting portions 63a, 63b, 64a, 64b are covered with the skid plate 24, it is possible to surely protect these swing shafts 205 and the suspension arm mounting portions 61a, 61b, 62*a*, 62*b*, and the suspension arm mounting portions 63*a*, 63*b*, 64*a*, 64*b* whereby the reliability of the all terrain vehicle 10 can be enhanced.

Further, as has been explained in conjunction with FIG. 6 and FIG. 15, the underframe 101 arranges the radiator 261 in the inside thereof, the radiator 261 is constituted of three divided radiators, the left and right radiators 262, 263 which are formed on left and right sides are arranged above the respective left frame 161 and the right frame 162 which constitute the left and right frame members of the underframe 101, and the center radiator 264 which is provided between the left and right radiators 262, 263 is arranged between the left frame 161 and the right frame 162 on the left and right sides.

Since the left radiator 262 and the right radiator 263 are arranged above the left frame 161 and the right frame 162 respectively and the center radiator 264 is arranged between the left frame 161 and right frame 162, it is possible to arrange the left radiator 262 and the right radiator 263 by making use of the maximum width of the underframe 101 and, at the same time, it is possible to extend the center radiator 264 downwardly whereby the projection area of the whole radiator 261 in the frontward direction of the vehicle body can be further increased thus enhancing the cooling ability of the radiator 261.

Moreover, as has been explained in conjunction with FIG. 3, FIG. 6 and FIG. 10, the skid plate 24 having the upper peripheral portion thereof formed in an approximately M shape in a front view is mounted on the front portion of the vehicle body frame 11 for protecting the front portion of the vehicle body.

By forming the upper peripheral portion of the skid plate 24 into an approximately M shape in a front view, the letter-M-shaped end portions, that is, the left and right ends of the upper portion and the left and right ends of the lower portion project. Accordingly, by covering the left and right swing members 173, 174, the proximal portions of the upper arm 61, 62, the proximal portions of the lower arms 63, 64 and the like, for example, which constitute the constitutional parts of the front suspensions 17 with these portions, it is possible to effectively protect the constitutional parts of the front suspensions 17 with the skid plate 24.

Further, the left and right front cushion units 21, 21 extend in the approximately front-to-rear direction and have front ends thereof covered with the crest portions of the M-shaped skid plate 24.

Since the front ends of the front cushion units 21, 21 are covered with the crest portions of the letter-M-shaped skid plate 24, it is possible to protect the front ends of the front cushion units 21, 21 with the skid plate 24 whereby it is possible to prevent jumping stones or the like from hitting the front ends of the front cushion units 21, 21.

Further, the skid plate 24 is mounted on a front frame portion 106 of the under frame 101 of a tapered front frame formed by casting.

Since the skid plate 24 is mounted on the tapered front frame portion 106 formed by casting, it is possible to firmly support the skid plate 24 on the front frame portion 106 whereby the vibrations of the skid plate 25 or the like can be prevented.

Further, the upper arms 61, 62 and the lower arms 63, 64 as the pairs of upper and lower suspension arms are formed on left and right sides of the vehicle body, the push rods 171, 172 as the rods are connected with the lower arms 63, 64 at the lower sides of the suspension arms, distal ends of the push rods 171, 172 are connected with the front cushion units 21, 21 by way of the delta links 173, 174 as the link members, and front portions of the delta links 173, 174 are covered with the skid plate 24.

Since the front portions of the delta links 173, 174 are covered with the skid plate 24, it is possible to surely protect the delta links 173, 174 on which the large load acts from the lower arm 63, 64 sides by way of the push rods 171, 172 whereby the reliability of the all terrain vehicle 10 can be enhanced.

Here, although the skid plate is formed in an approximately M shape in a front view in the present invention, the present invention is not limited to such a shape and the skid plate may be formed in an H shape, a U shape, a V shape, a W shape, a Y shape, an X shape or a shape which is close to these shapes in a front view.

Moreover, as has been explained in conjunction with FIG. 2, FIG. 4, FIG. 13 and FIG. 14, in the all terrain vehicle 10 provided with the sub frame 25 on the rear portion of the vehicle body frame 11, the sub frame 25 includes the fender mounting portion (to be more specific, side projecting portions 66, 67) on which the rear fenders 31, 32 for covering left and right rear wheels 14, 15 from above are mounted, the seat rail which constitutes the seat support portion for supporting the seat on which the occupant sits, and the grab rail 25*a* which constitutes the grab portion which a person can grab.

By providing the fender mounting portion, the seat support portion and the grab portion to the sub frame 25, the sub frame 25 can be used for multiple purposes and hence, compared to the case in which the fender mounting portion, the seat support portion and the grab portion are provided separately, the present invention can reduce the number of parts and the number of assembling man-hours whereby the cost can be reduced.

Further, the left and right rear fenders 31, 32 is formed separately.

For example, compared to the case in which the rear fenders 31, 32 are laterally integrally formed, the present invention can miniaturize the left and right fenders 31, 32 and hence, the assembling property and the maintenance property can be enhanced.

Further, the sub frame 25 includes the tail lamp mounting portion 247 which constitutes the tail lamp support portion for supporting the tail lamp 246.

By providing the tail lamp mounting portion 247 to the sub frame 25, compared to the case in which the tail lamp support portion is particularly provided, the number of parts can be reduced and hence, the cost can be reduced.

Further, the mufflers 53, 54 which are connected with the exhaust pipes 51, 52 side extended from the engine 45 are arranged between the sub frame 25 and the seat 57 and, at the same time, the mufflers 53, 54 are projected from the sub frame 25 and the rear end portion of the seat 57.

By arranging the mufflers 53, 54 between the sub frame 25 and the seat 57 and, at the same time, by allowing the mufflers 53, 54 to project between the sub frame 25 and the rear end portion of the seat 57, it is possible to reduce portions which are exposed to the outside of the mufflers 53, 54 and hence, the appearance can be enhanced.

Further, the sub frame 25 is integrally formed by casting.

By integrally forming the sub frame 25 by casting, it is possible to easily form the sub frame 25 whereby the cost of sub frame 25 can be reduced.

Although the sub frame of the present invention performs all of respective functions of the fender mounting portion, the seat support portion and the grab portion, the sub frame may further function as a support portion for supporting a license plate.

Moreover, as has been explained in conjunction with FIG. 3, FIG. 8 and FIG. 10, in the suspension structure of the all terrain vehicle 10 in which suspension arms, that is, the upper arms 61, 62 and the lower arms 63, 64 are respectively mounted on left and right sides of the front portion of a vehicle body frame 11, the front cushion units 21, 21 which absorb an impact which is transmitted to the vehicle body frame 11 along the vehicle body frame 11 are arranged to extend in the substantially front-to-rear direction of the vehicle, one ends of the front cushion units 21, 21 are connected with the vehicle body frame 11, the delta links 173, 174 which constitute link members ate swingably mounted on the vehicle body frame 11 by way of the swing shafts 205 which constitute the pivot portions, and the other ends of the front cushion units 21, 21 are connected to the delta links 173, 174, wherein the delta links 173, 174 are rotatably provided in a plane along the front-to-rear direction of the vehicle body and, at the same time, are connected with the lower arms 63, 64 by way of the pushing rods 171, 172 which constitute rods which extend in the substantially vertical direction.

By connecting the other ends of the front cushion units 21, 21 with the lower arms 63, 64 by way of the delta links 173, 174 which are rotatably provided in a plane along the front-to-rear direction of the vehicle body and the pushing rods 171, 172 which extend in the substantially vertical direction, the up-and-down movement of the lower arms 63, 64 can be smoothly converted into the up-and-down movement of the pushing rods 171, 172 which substantially extend vertically and, then, the up-and-down movement of the pushing rods 171, 172 can be effectively converted into the stroke of the front cushion units 21, 21 in the front-to-rear direction of the vehicle.

Further, with the use of the pushing rods 171, 172, it is possible to arrange the front cushion units 21 without being restricted by the position of the lower arms 63, 64 and hence, the degree of freedom of the arrangement of the front cushion units 21 can be increased.

For example, by arranging the front cushion units 21 along the vehicle body frame 11 and close to the vehicle body frame 11, it is possible to suppress the projecting quantity of the front cushion units 21 from the vehicle body frame 11 and hence, the all terrain vehicle 10 can be made slim whereby the miniaturization and the compacting of the all terrain vehicle 10 can be realized.

Further, by arranging the front cushion units 21 close to the vehicle body frame 11, it is possible to concentrate the mass of the front cushion units 21 at the vehicle center side whereby the traveling performance such as the turning performance of the all terrain vehicle 10 can be enhanced.

Further, as has been explained in conjunction with FIG. 5, FIG. 8, FIG. 9 and FIG. 11, the suspension arms, that is, the upper arms 81, 82 and the lower arms 83, 84 are respectively mounted on the left and right sides of the rear frame 106 which constitutes the rear portion of the vehicle body frame 11, and the left and right rear cushion units 22, 22 which absorb an impact which is transmitted to the vehicle body frame 11 by way of these lower arms 83, 84 are arranged substantially parallel along the vehicle body frame 11.

By arranging the left and right rear cushion units 22, 22 substantially parallel to the vehicle body frame 11, it is possible to make the rear portion of the vehicle body slim and hence, it is possible to enhance the get-on-and-off performance and the appearance of the all terrain vehicle 10 while achieving the miniaturization and the compacting of the all terrain vehicle 10.

Further, as has been explained in conjunction with FIG. 8 and FIG. 12, the rear cushion unit 22 includes the hole portion 22g which is opened in the direction orthogonal to an axis In the end portion thereof, and the reservoir tank 233 is mounted by fitting the reservoir tank 233 in the hole portion 22g.

By fitting and mounting the reservoir tank 233 into the hole portion 22g formed in the rear cushion unit 22 in the direction orthogonal to the axis, it is possible to provide a novel appearance to the rear cushion unit 22 whereby the product performance of the rear cushion unit 22 can be enhanced.

Further, the suspension arms constitute a double wishbone type suspension which is provided with a vertical pair of upper arms 61, 62 and lower arms 63, 64 at one sides thereof, and the pushing rods 171, 172 are connected with the lower arms 63, 64 at the lower side.

By connecting the pushing rods 171, 172 with the lower-side arm 63, 64 at the lower side, it is possible to arrange the suspension structure at a low position and hence, it is possible to set the center of gravity at a low level.

Although the reservoir tank is provided to the rear cushion unit in the present invention, the present invention is not limited to such a case and the reservoir tank may be provided to the front cushion unit for the front wheel.

The vehicle body frame structure, the skid plate, the sub frame, and the suspension structure of the present invention is suitably applicable to the vehicle which travels on the leveled land and the unleveled land.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle body frame structure of an all terrain vehicle comprising:
   an underframe that constitutes a lower portion of a vehicle body frame;
   a cushion unit, extending in a substantially front-to-rear direction along the vehicle body frame;
   a link member swingably mounted on the vehicle body frame through a pivot portion; and
   a suspension arm mounted on the front portion for supporting a front wheel;
   wherein the cushion unit includes one end mounted on the vehicle body frame side and the other end connected to the link member,
   wherein the link members are connected with the suspension arm through a rod, and
   wherein the underframe includes a front portion in a triangular shape and forms a peak shape in a plan view, and is integrally formed by casting.

2. A skid plate mounted on a front portion of a vehicle body frame for protecting a front portion of the vehicle comprising:
   an upper peripheral portion formed in an approximately M shape in a front views,
   wherein front ends of front cushion units extending in an approximately front-to-rear direction of the vehicle are covered with crest portions of the M shape of the skid plate.

3. The skid plate according to claim 2, wherein the skid plate is mounted on a front portion of a tapered front frame formed by casting.

4. The skid plate according to claim 2, wherein a pair of upper and lower suspension arms are formed on left and right sides of the vehicle body, rods are connected with lower sides of the suspension arms, distal ends of the rods are connected with the front cushion units through link members, and front portions of the link members are covered with the skid plate.

* * * * *